INVENTORS
JAN A. RAJCHMAN &
BY ARTHUR W. LO
Morris L. Rabkin
ATTORNEY

INVENTORS
JAN A. RAJCHMAN &
ARTHUR W. LO
BY Morris L. Rabkin
ATTORNEY

INVENTORS
JAN A. RAJCHMAN &
BY ARTHUR W. LO
Morris Rabkin
ATTORNEY

INVENTORS
JAN A. RAJCHMAN &
ARTHUR W. LO
BY Morris L. Rakkin
ATTORNEY

INVENTORS
JAN A. RAJCHMAN &
ARTHUR W. LO
BY Morris [signature]
ATTORNEY

INVENTORS
JAN A. RAJCHMAN &
ARTHUR W. LO
BY Morris A. Rabkin
ATTORNEY

2,994,069
MAGNETIC CONTROL SYSTEMS

Jan A. Rajchman, Princeton, and Arthur W. Lo, Fords, N.J., assignors to Radio Corporation of America, a corporation of Delaware Original application Sept. 13, 1954, Ser. No. 455,725. Divided and this application Nov. 30, 1956, Ser. No. 625,334
12 Claims. (Cl. 340—174)

Figures 1A, 1C:
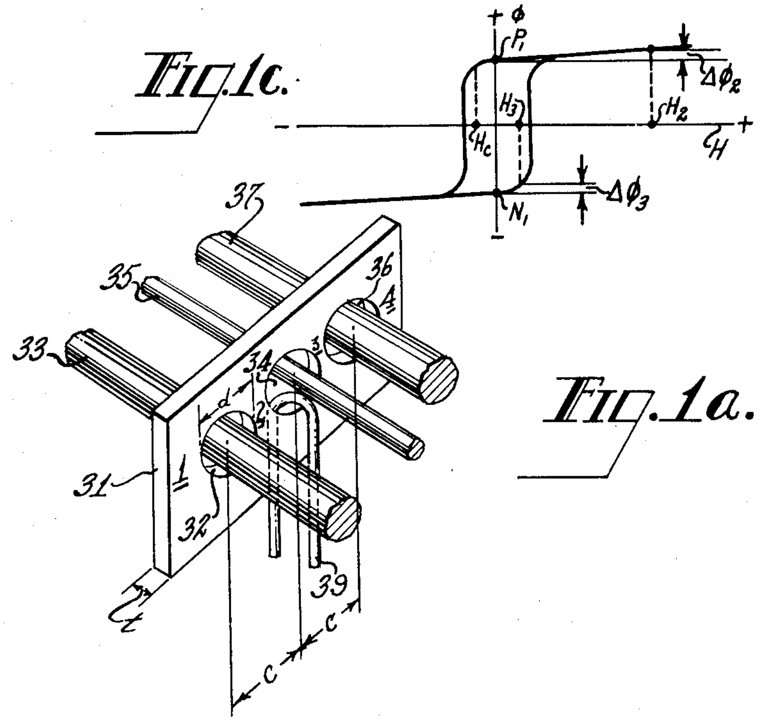

This invention relates to magnetic systems and particularly to methods of and means for controlling electrical signals by means for such systems.

This application is a division of our copending application entitled "Magnetic Systems," Serial No. 455,725, filed September 13, 1954, and assigned to the same assignee as the present invention.

Use is made in the electrical arts of magnetic material whose magnetic properties are characterized by substantially rectangular hysteresis loops. A hysteresis loop for a magnetic material in a cyclicly magnetized condition (that is, in cycles of equal amplitude and opposite polarity magnetizing forces), is a curve showing, for each value of magnetizing force, two values of the magnetic induction, one when the magnetizing force is increasing, the other when it is decreasing. A rectangular hysteresis loop is one which is substantially rectangular in shape. It is assumed, as usual, that the curve is plotted in rectangular coordinates with the magnetic flux plotted along the vertical axis and the magnetizing force plotted along the horizontal axis. Ordinarily, the flux $\phi$ and the flux density per unit volume B are proportional. Material with rectangular hysteresis loops is useful in its qualities of "remembering" its previous magnetization by a magnetizing force.

In a given infinitesimal volume of magnetic material, it is convenient to consider the absolute value of the vector of magnetic induction (which is the flux density at a point) in the absence of a magnetizing force as defining the state of remanence of that volume. The state of remanence in that volume depends upon the magnetic properties of the material and the previous histories of excitation, and is defined by a point of intersection of the hysteresis loop and the magnetic induction (B) axis.

The intersections of the upper and lower horizontal portions respectively of a rectangular hysteresis loop with the vertical (flux) axis, represent two states of saturation at remanence. One loop, called the major loop, is that approached as a limiting curve by increasingly large values of magnetizing force.

There is a family of minor loops each similar to the major loop on a smaller scale and each reflecting the shape of the major loop. Each minor loop has its own two intersections with the flux axis, one intersection representing a given state of saturation at remanence, and the other intersection representing the opposite state of saturation at remanence.

Among the materials exhibiting the desired rectangular hysteresis loops are certain ferro-magnetic spinel materials such as manganese-magnesium, and certain metallic materials such as mopermalloy.

There are two senses of flux flow around a closed path. A positive current flowing into a surface bounded by the path produces a clockwise flux flow in the path. One state of saturation at remanence, with reference to a closed flux path, is that in which the saturating flux is directed in a clockwise sense (as viewed from one side of the surface) around the closed path; and the other state of saturation at remanence is that in which the saturating flux is directed in the counterclockwise sense (as viewed from the same side of the surface) around the closed path. The convention is adopted that the upper horizontal loop intersection with the vertical flux axis is the P (positive) state of saturation at remanence and corresponds to the one state with reference to the closed flux path; and that the lower horizontal loop intersection with the vertical flux axis is the N (negative) state of saturation at remanence and corresponds to the other state with reference to the closed flux path.

Examples of the use of the rectangular hysteresis loop magnetic material may be found in magnetic amplifiers, and in electrical computers having registers and memories that use magnetic cores. In magnetic amplifier devices, the operation depends on the combined effect on the magnetic material of a simultaneous energizing source and a controlling signal. The magnetic core registers and memories utilize the magnetic material of the cores as a static storage device. By means of the present invention, rectangular hysteresis loop magnetic material is employed to obtain advantages found in both magnetic amplifiers and magnetic core devices.

It is an object of this invention to provide an improved magnetic system by means of which electric signals representing, for example, as intelligence, power, etc., can be controlled in accordance with the setting of an electric impulse.

Another object of this invention is to provide an improved magnetic system and method of operation thereof for controlling electric signals in such a manner that no holding power is required in the exercise of the control.

Still another object of this invention is to provide an improved magnetic system and method of operation thereof for storing information.

Still another object of this invention is to provide an improved method of and means for storing information.

Yet another object of the present invention is to provide an improved magnetic storage device capable of retaining stored information indefinitely notwithstanding repreated read-out.

A further object of the present invention is to provide a novel magnetic storage device having independent write and read circuits.

A still further object of the present invention is to provide an improved magnetic device of the character set forth above which is inexpensive to fabricate.

According to the invention, magnetic material saturated at remanence is used. The magnetic material has a plurality of distinct, closed flux paths. A selected one of the flux paths has two different portions of magnetic material saturated at remanence. Excitation means are provided selectively to excite the two different portions of a selected flux path, either to the same state of saturation at remanence along the selected path, or to opposite states of saturation at remanence along the selected path. An alternating magnetizing current is employed to apply alternating magnetizing forces along the selected path. By suitable means, for example an output winding linking the selected path, a response may be derived which is dependent on whether the selected path portions are in the same or opposite states of remanence with respect to the selected path. Thus, the transmission of an alternating current signal may be controlled by the selection of the remanent states of saturation of the selected path portions.

A device constructed according to the principles of the invention is termed a "transfluxor." A transfluxor is made by providing two or more apertures in a magnetic material having the characteristic of being substantially saturated at remanence. These apertures are sufficient to provide at least three flux paths. A selected one of these flux paths has portions common to at least two other flux paths. An appropriate magnetizing force does or does not produce a substantial flux change along the selected path depending upon whether it is magnetized along its entire length in the same sense of saturation, or has portions in it saturated at remanence in different senses.

At any instant, an alternating input current (except when at zero value) which links a selected flux path causes a magnetizing force in one sense which tends to produce more flux in this one sense around the path. If all portions of the selected path are saturated at remanence in a common sense along this path, an alternating input current of given amplitude (at least after the first half cycle) which links the path reverses the flux sense repeatedly in this path. In such case, an output voltage is induced in an output winding linking the path as a result of the changing flux due to these reversals. If, now, any two of these portions are saturated at remanence in opposite senses along the path, the instantaneous magnetizing force tends further to saturate one of the two specified portions in the sense in which it is already saturated. Because of the saturation, however, further appreciable flux change of this one portion cannot occur in this one sense. Therefore, there is substantially no flux change in the selected path and substantially no voltage is induced in the output winding.

Several embodiments of a transfluxor are described hereinafter. In some embodiments the transfluxor may have only two apertures for each unit. Others may have three or more apertures. The output may be taken by way of a single winding or by way of two windings. The transfluxor may be arranged to produce an output on one winding for one polarity of input signal, and a signal on another output winding for a different polarity of input signal.

Figure 1B:
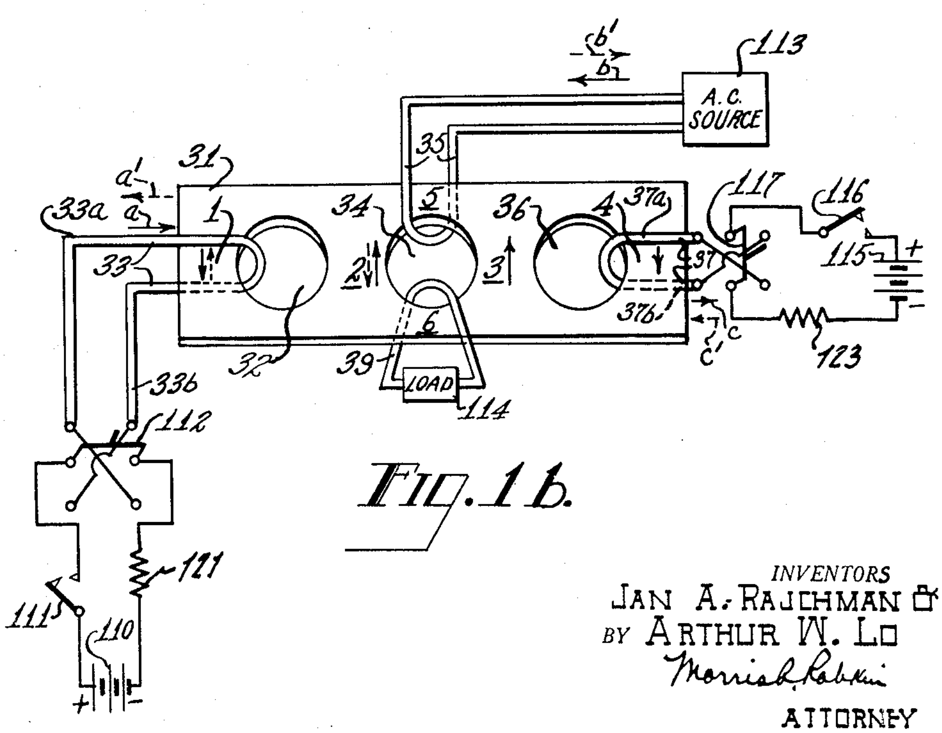
Figure 1D:
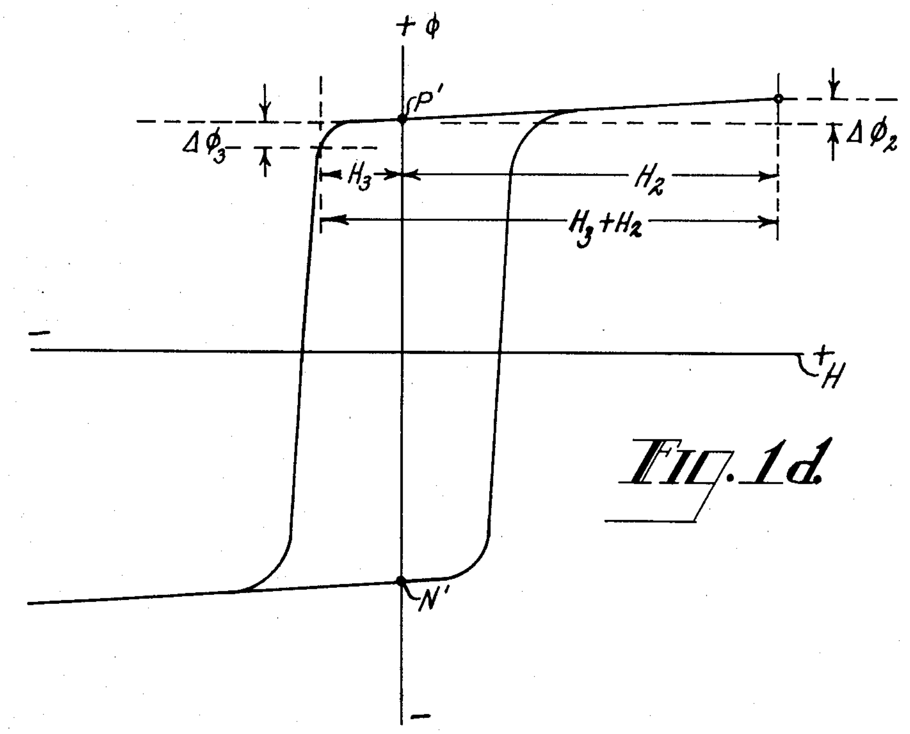
Figure 4A:
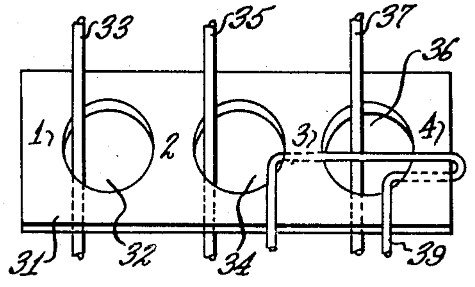
Figure 4B:
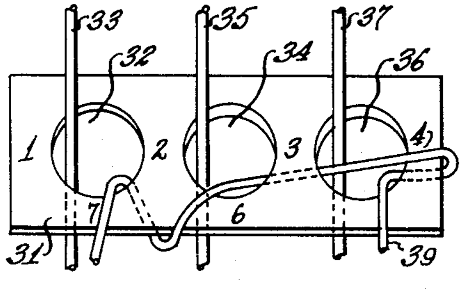
Figure 4C:
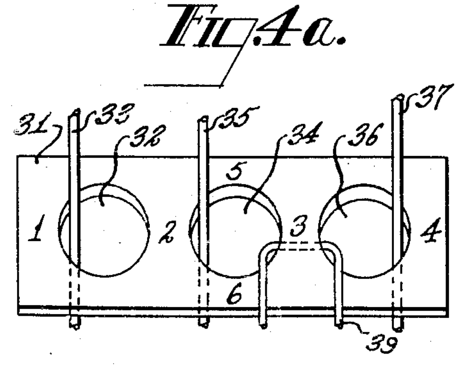
Figures 2A, 2B, 3A, 3B:
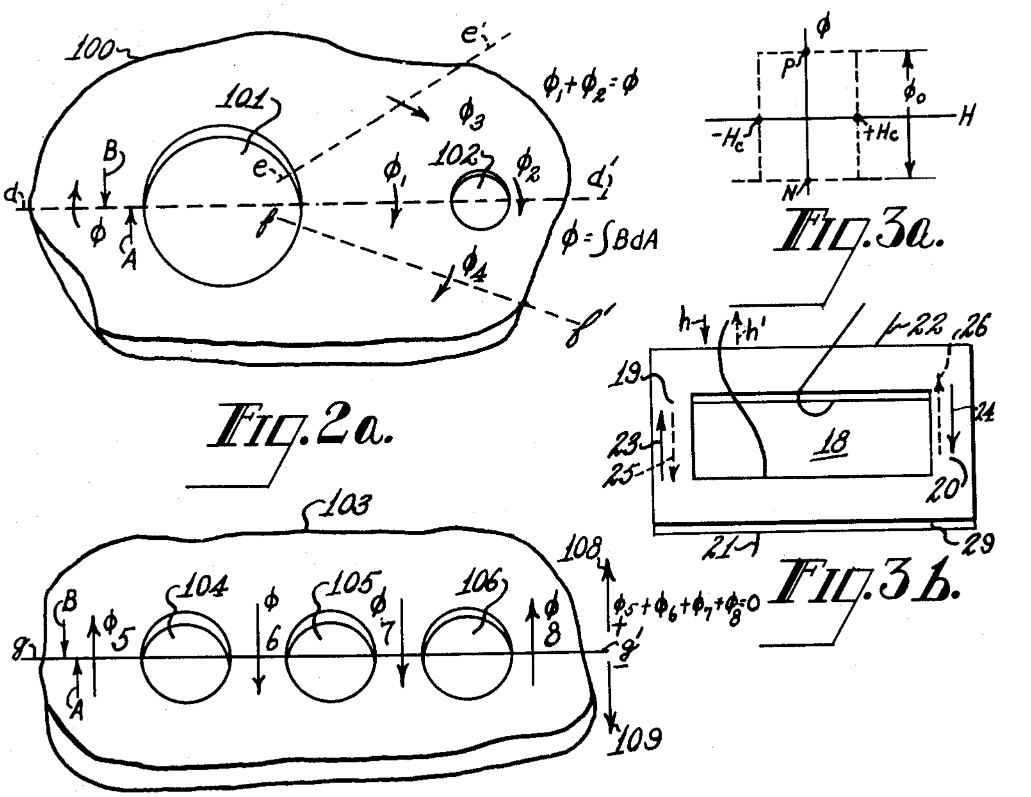
Figure 2C:
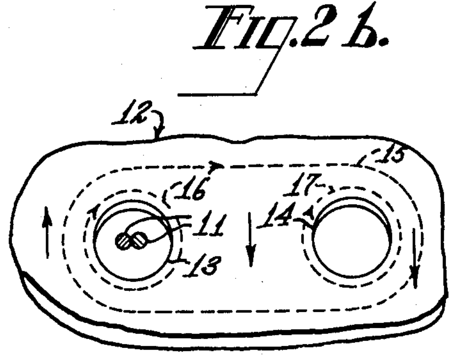
Figure 3C:
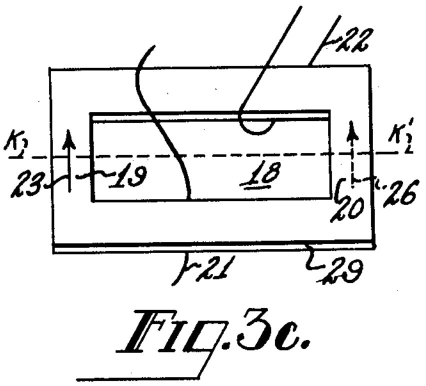
Figure 5A:
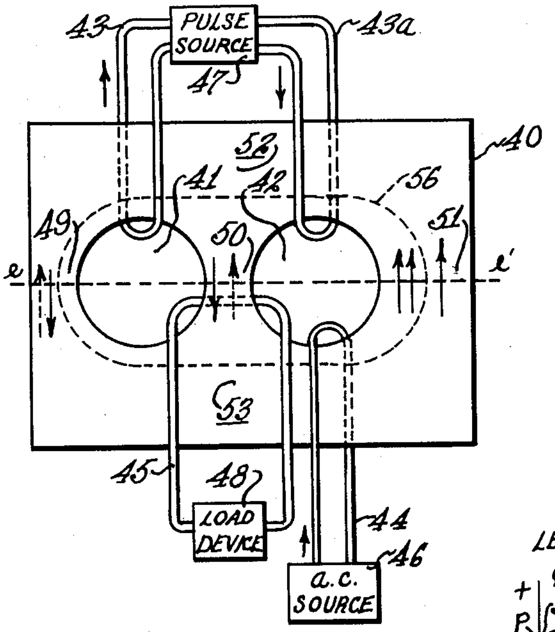
Figure 5B:
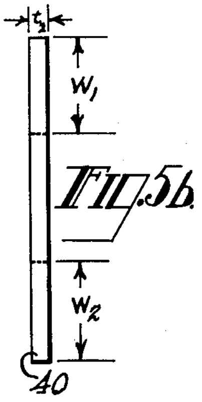
Figure 5C:
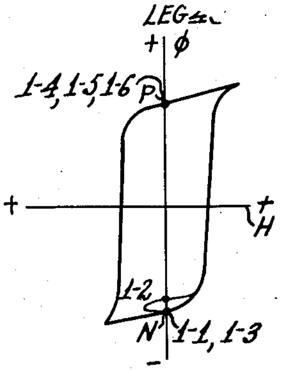
Figure 5D:
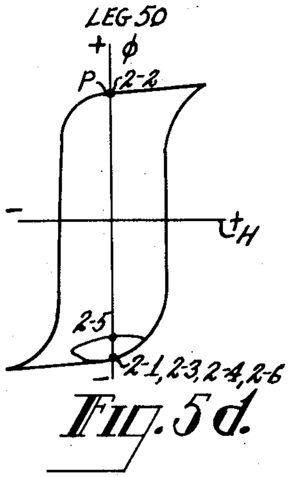
Figure 5E:
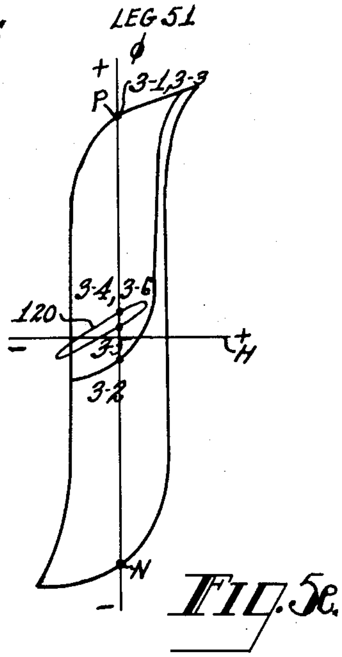
Figure 5F:
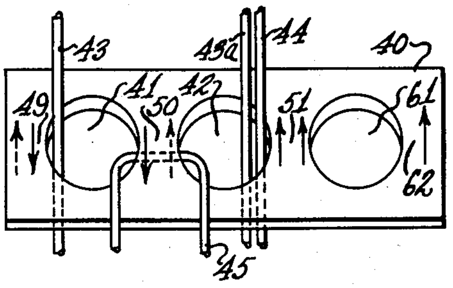
Figures 6A, 6B, 6C, 6D:
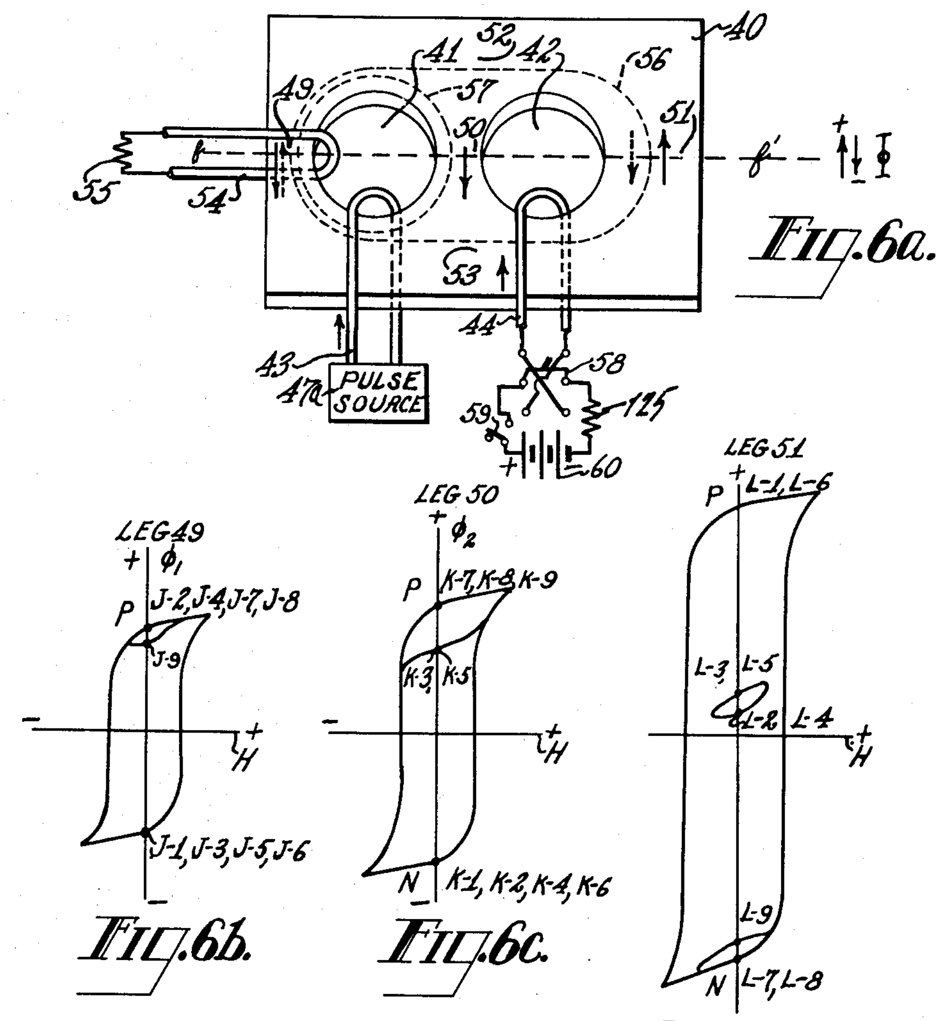
Figure 6E:
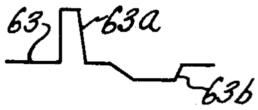
Figure 6F:
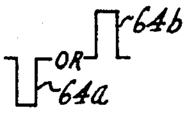
Figure 7:
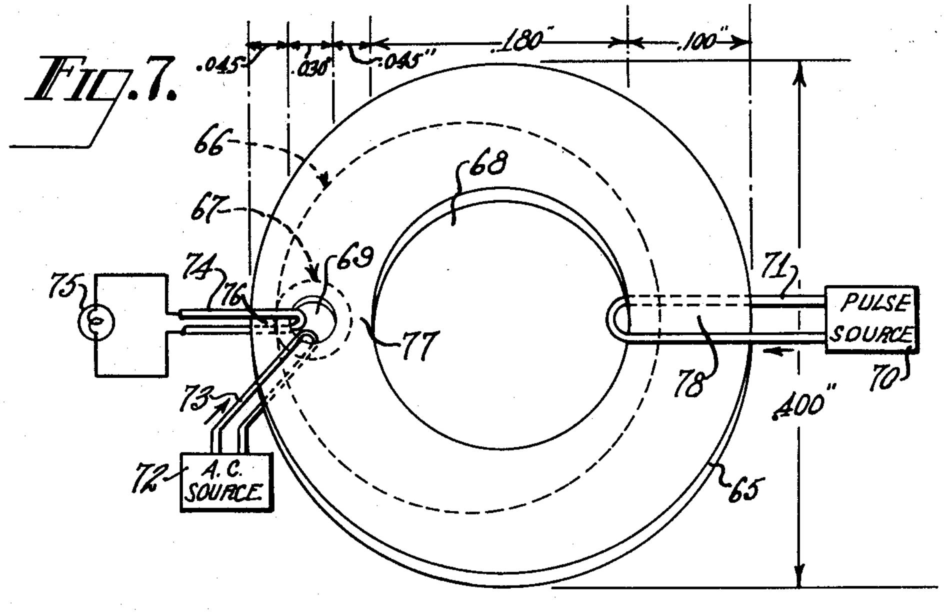
Figures 8A, 8B:
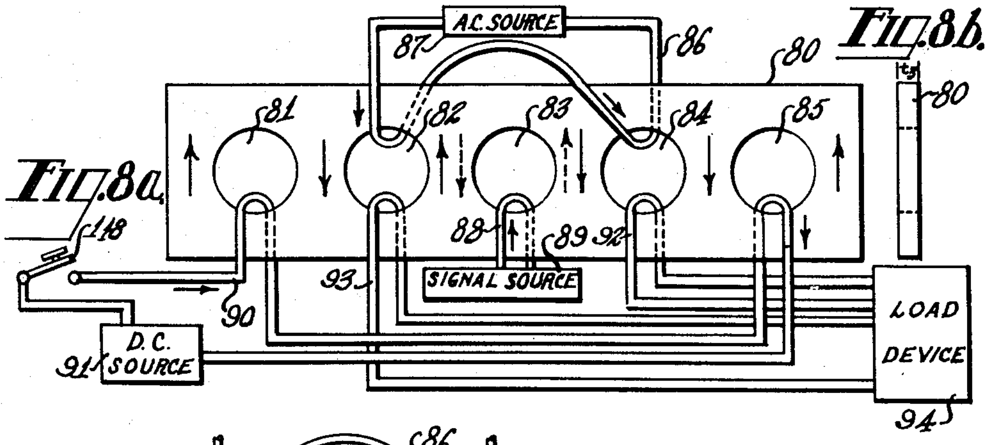

The invention will be more fully understood, both as to its organization and method of operation, from the following description when read in connection with the accompanying drawing in which:

FIG. 1*a* is a three-dimensional view of a transfluxor according to this invention, having three apertures, and showing a portion of its coupled input and output windings;

FIG. 1*b* is a schematic diagram of a magnetic system employing the transfluxor of FIG. 1*a*;

FIGS. 1*c* and 1*d* are composite rectangular hysteresis loops relating to the transfluxor of FIG. 1*a* illustrating flux changes at a saturated condition;

FIGS. 2*a*, 2*b*, and 2*c* are three-dimensional views of irregularly-shaped bodies illustrating various conditions of flux flow therein, and useful in considering the theory of operation of a transfluxor according to this invention;

FIG. 3*a* is an idealized rectangular hysteresis loop, such as would be most desirable for a material of the type used in practicing this invention;

FIGS. 3*b* and 3*c* are diagrammatic views of a simple magnetic circuit having a single aperture, and also useful in considering the theory of operation of our transfluxor;

FIGS. 4*a*, 4*b* and 4*c* are diagrammatic views illustrating different methods by which an output winding may link a transfluxor of this invention;

FIG. 5*a* is a schematic view of another embodiment of a magnetic system employing a transfluxor according to this invention and having two apertures;

FIG. 5*b* is an end view of the transfluxor of FIG. 5*a*;

FIGS. 5*c*, 5*d* and 5*e* are graphs of typical hysteresis loops relating to the transfluxor of the two-aperture type shown in FIG. 5*a*;

FIG. 5*f* is a schematic diagram showing a modified form of the transfluxor of FIG. 5*a*;

FIG. 6*a* is a schematic diagram illustrating a different mode of operating a magnetic system employing the transfluxor of FIG. 5*a*;

FIGS. 6*b*, 6*c* and 6*d* show various hysteresis curves relating to the states of saturation of portions of the transfluxor of FIG. 6*a*;

FIGS. 6*e* and 6*f* show representative waveshapes of current pulses which may be applied to the input windings of the transfluxor of FIG. 6*a*;

FIG. 7 is a schematic view of a complete operating system including a transfluxor having two apertures according to this invention;

FIG. 8*a* is a schematic view of another system according to this invention, using a polarity-sensitive transfluxor having five apertures;

FIG. 8*b* is an end view of the transfluxor of FIG. 8*a*, and

Figure 8C:
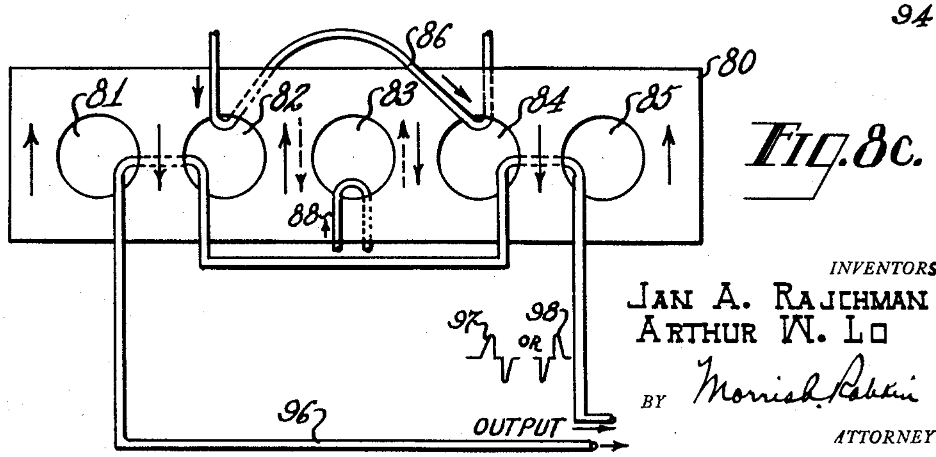

FIG. 8*c* is a schematic view illustrating a modified form of the system of FIG. 8*a*.

Referring to FIG. 1*a*, there is shown a magnetic body 31 comprised of a rectangularly-shaped plate of uniform thickness "*t*." The plate 31 is provided with at least three apertures 32, 34 and 36, each of which may be of a diameter "*d*." The three apertures may be located at a center-to-center spacing "C." The diameter "*d*" and the center-to-center spacing "C" are chosen such that the widths of the legs 1, 2, 3 and 4 along a longitudinal line through the centers of the apertures 32, 34 and 36 are substantially equal. The diameters *d* may be unequal, and the spacings C may be unequal.

The plate 31 may, for example, be molded from a powder-like, manganese-magnesium ferrite and annealed at a suitably high temperature to obtain the desired magnetic characteristics. Other rectangular hysteresis loop magnetic materials, such as mopermalloy, may be employed.

The magnetic material limiting aperture 32 is linked by a winding 33, the magnetic material limiting aperture 34 is linked by a winding 35 and a winding 39, and the magnetic material limiting aperture 36 is linked by a winding 37. The windings are shown as single-turn windings, but multi-turn windings may be used, if desired.

In FIG. 1*b*, the winding 33 is shown connected to the fixed pair of terminals of a reversing switch 112. The arms of the reversing switch 112 are connected across a current source, such as a battery 110 and a series resistance 121. A switch 111 is interposed in one of the leads which connect the battery 110 and the reversing switch 112. The winding 35 is connected to an A.C. (alternating current) source 113. The winding 39 is connected to a load 114. The winding 37 is connected across the fixed terminals of a reversing switch 117. The arms of the reversing switch 117 are connected across a current source, such as a battery 115 and a series resistance 123. A switch 116 is interposed in one of the leads connecting the battery 115 and the reversing switch 117. The arrows *a*, *a'*, *b*, *b'*, *c*, *c'*, adjacent the respective windings 33, 35, and 37 indicate the conventional current flow in a direction opposite to the electron flow.

The operation of the magnetic system of FIG. 1*b* is as follows: The reversing switch 117 is operated by throwing the movable arm to the left (as viewed in the drawing) to connect the lead 37*a* of the winding 37 through the switch 116 to the positive terminal of the battery 115, and the lead 37*b* to the negative terminal of the battery 115. Upon closure of switch 116, a positive excitation current flows in the winding 37 in the direction of arrow *c*, thereby causing a clockwise flux flow around aperture 36. The clockwise flux flow around aperture 36 is indicated by the solid arrows on the legs 3 and 4. The reversinv switch 112 is operated by throwing the movable arm up (as viewed in the drawing) to connect the lead 33*a* of the winding 33 through the switch 111 to the positive terminal of the battery 110, and the lead 33*b* to the negative terminal of the battery 110. Upon closure of the switch 111, a positive excitation current flows in the winding 33 in the direction of arrow *a*, thereby causing a clockwise flux flow around aperture 32. The clockwise flux flow around aperture 32 is indicated by the dotted arrows on the legs 1 and 2. The switches 116 and 111 may be closed simultaneously or successively in any order. If the switches 116 and 111 are then opened, the portions of the magnetic material respectively limiting the apertures 32 and 36 are in the one state, for example, the state P, of saturation at remanence with reference to respective flux paths immediately around the apertures 32 and 36.

In many cases concerning multi-aperture magnetic circuits, it is convenient to consider the direction of flux flow through a surface which intersects some or all of the apertures, such, for example, as the plane represented by the dash line *d—d'* of FIG. 2*a*. Thus, the direction of flux flow at any point of the surface is defined as along a normal to the surface from one side A of the surface to the other side B of the surface, or vice versa. One of these two directions is selected as the positive direction and the other of the two directions is then the negative direction. In the example given and also hereinafter, the intersecting surface is chosen to be a horizontal plane cutting the apertures. The horizontal plane is represented in FIG. 2*b* by the line *g—g'*. The positive direction of flux flow in FIG. 2*b* is taken as being in an upward direction, and the negative direction is taken as downward. In the case of the plane *g—g'*, the direction of flux flow at any point of the plane is always in the vertical, as illustrated.

Note that the sense of flux flow, and the corresponding state P or N of saturation at remanence, is taken with reference to a closed flux path. The direction of flux flow in the respective legs 1, 2, 3 and 4 is taken as positive or negative without reference to a closed flux path, but with reference to the intersecting surface, mentioned above.

In FIG. 1*b*, the vertical arrows applied to the respective legs 1, 2, 3 and 4 indicate both the sense and the direction of flux flow around the apertures 32, 34 and 36. The dotted arrows on the legs 1 and 2 and the solid arrows on the legs 3 and 4 indicate the sense and direction of flux flow in these legs subsequent to the application of a positive excitation current *a* and *c* to the windings 33 and 37. The legs 1 and 2 which limit aperture 32, are both at state P of saturation at remanence with reference to the flux path around aperture 32; and the legs 3 and 4 which limit the aperture 36, are also both at state P of saturation at remanence with reference to the flux path around aperture 36. However, the legs 2 and 3, which limit the aperture 34, are at state N of saturation at remanence with reference to the flux path around aperture 34. That is, the sense of flux flow around apertrue 34 is counterclockwise. The direction of flux flow in the legs 1 and 3 is positive, and the direction of flux flow in the legs 2 and 4 is negative.

If, now, a positive excitation current is applied by the A.C. source 113 (FIG. 1*b*) to winding 35 in the direction of arrow *b*, a clockwise flux flow is produced around aperture 34. When the positive excitation current applied to the winding 35 is terminated, the state N of saturation at remanence of legs 2 and 3 is then reversed to a state P of saturation at remanence with reference to aperture 34. The flux flow around aperture 34 induces a voltage of one polarity in output winding 39 which links a portion of the magnetic material limiting the aperture 34. The voltage induced in winding 39 is applied across the load device 114. The direction of flux flow in leg 2 is reversed to the positive direction and the direction of flux flow in the leg 3 is reversed to the negative direction.

Of the positive excitation current applied to winding 35 is followed by a negative excitation current, furnished by A.C. source 113, in the direction of arrow *b'* a counterclockwise flux flow is established around aperture 34. The states of saturation at remanence of the portions of the magnetic material limiting the aperture 34, after the negative excitation current is applied, are reversed back to the initial state N of saturation at remanence. The directions of flux flow in the legs 2 and 3 are also reversed back to the respective negative and positive directions, as shown by the dotted arrows applied to the leg 2 and the solid arrow applied to the leg 3.

The sequence of alternate positive and negative excitation currents applied to winding 35 may be continued indefinitely. The state of saturation at remanence of the portions of the magnetic material limiting the aperture 34, and the directions of flux flow in legs 2 and 3 reverse back and forth with the clockwise and counterclockwise flux flow established by the corresponding excitation currents. A voltage is induced in the output winding 39 each time the sense of flux flow in the path around aperture 34 reverses.

Now, let the reversing switch 112 be operated by throwing the movable contacts down to connect lead 33*b* through the switch 111 to the positive terminal of battery 110 and lead 33*a* to the negative terminal of battery 110. Upon the closure of switch 111, a negative excitation current in the direction of arrow *a'* flows in winding 33, and a counterclockwise flow of flux is established around aperture 32. When the switch 111 is opened, the state of saturation at remanence of the portions of the magnetic material limiting aperture 32 are reversed from the state P of saturation at remanence to the state N of saturation at remanence with reference to aperture 32. The sense of flux flow around the apertures 32, 34 and 36, and the direction of flux flow in the legs 1, 2, 3 and 4 after the switch 111 is operated, are shown by the solid arrows applied to the respective legs. The legs 1 and 2 are respectively reversed to state N of saturation at remanence with reference to aperture 32. However, the leg 2 is at a state P of saturation at remanence and the leg 3 is at a state N of saturation at remanence with reference to aperture 34. The direction of flux flow in the legs 1 and 4 is negative and the direction of flux flow in the legs 2 and 3 is positive.

If, now, a positive excitation current is applied by A.C. source 113 to the winding 35 in the direction of arrow *b*, no flux flow is produced around the aperture 34 because the leg 2 is saturated and the flux cannot be increased. Likewise, if a negative excitation current pulse is applied by A.C. source 113 to the winding 35 in the direction of arrow *b'*, no flux flow is produced because leg 3 is saturated. Because no change of flux flow occurs around the aperture 34, no voltage is induced in output winding 39. Consequently, the response of the magnetic system of FIG. 1*b* to a signal applied to winding 35 can be controlled by the polarity of the excitation current previously applied to winding 33.

The postive excitation current applied to winding 37 is in the nature of a reference excitation current for causing the portions of the magnetic material limiting aperture 36 to assume a reference state P of saturation at remanence, this being the state P in the example just described. The opposite response to the excitation currents furnished by source 113 is obtained when the opposite reference state N of saturation at remanence is established in the portions of magnetic material limiting aperture 36.

Now, assume that the portions of the magnetic material limiting aperture 36 are at state N of saturation at remanence as a result of a reference excitation current in the direction *c'* applied by the source 115. Assume, also, that the portions of the magnetic material limiting aperture 32 are at state P of saturation at remanence as a result of a positive excitation current in the direction of arrow *a*. Under these conditions, a flux flow is not produced around aperture 34 in response to either the positive or negative excitation currents furnished by source 113 because legs 2 and 3 are at opposite states of saturation with reference to aperture 34. The flux flow is saturated and does not increase in one of the legs 2 and 3 regardless of the sense of the magnetizing force resulting from current from the source 113. Suppose, however, that the portions of the magnetic material limiting aperture 32 are at state N of saturation at remanence instead of state P. In such case, as a result of a negative excitation current in the direction of the arrow *a'*, flux flow is produced around aperture 34 as a result of the negative excitation current in the direction *b'* furnished by the source 113. The subsequent positive excitation current in the direction *b* furnished by source 113 then reverses the sense of flux flow around aperture 34 to the clockwise sense. The sequence of a negative excitation current followed by a positive excitation current reverses the states of saturation at remanence of the portions of the magnetic material limiting aperture 34 back and forth between the states P and N. A voltage is induced in output winding 39 each time the sense of flux flow in the path around aperture 34 is reversed.

Therefore, for a given state of saturation at remanence of the portions of magnetic material limiting aperture 36, there is one setting of the state of the magnetic material limiting aperture 32 in which the A.C. signals furnished by source 113 are transmitted to output winding 39. Conversely, there is another setting of the state of the portions of magnetic material limiting aperture 32 in which the A.C. signals furnished by source 113 are blocked from being transmitted to output winding 39.

The theory which follows is proposed as a plausible explanation of the experimentally determined facts with which this theory is consistent. However, it is to be understood that the invention is not necessarily limited by the theory presented herein.

One of the attributes of a magnetic circuit, as expressed in mathematical language, is that the divergence of magnetic induction is zero. Consequently, magnetic flux paths are continuous and close upon themselves; and the quantity of magnetic flux flowing in a given path is the same even though the area traversed by the flux path may be different in different parts of the path.

For example, consider, as in FIG. 2*a*, an irregularly-shaped body of magnetic material such as the plate 100 having two apertures 101 and 102. The plate 100 also may be of irregular thickness. The apertures 101 and 102 divide the plate 100 into three different portions of magnetic material along the line *d—d'*. The apertures 101 and 102 also may be of irregular shape. Each one of the three portions has a different width measured along the line *d—d'*. Because the flux paths are continuous, the flux $\phi$ which flows in the portion of magnetic material on the left side of aperture 101 (as viewed in the drawing) is equal to the flux $(\phi_1+\phi_2)$ which flows in the portions of the magnetic material on the right side (as viewed in the drawing) of aperture 101 or (1) $$\phi=\phi_1+\phi_2$$

Likewise, the flux $\phi_3$ which flows through the portion of the magnetic material of a width taken along a line *e—e'* is equal to the flux $\phi_4$ which flows through the portion of the magnetic material of a different width taken along a line *f—f'*. Likewise, the flux $\phi_3$ is equal to the sum of the fluxes $(\phi_1+\phi_2)$ which flow in the portions of the magnetic material on each side of the aperture 102, or (2) $$\phi_3=\phi_4=\phi_1+\phi_2=\phi$$

For a given total flux $\phi$ the magnetic induction B decreases as the cross-sectional area through which the flux flows increases, and vice versa. This last relationship results from the fact that (3) $$\phi=\oint Bda$$

where $\phi$=flux
$B$=flux density or flux per unit area
$da$=a unit area

When a magnetic body has a number of parallel paths which can be traversed by the flux, then the algebraic sum of the fluxes crossing a surface defined by the intersection of a plane, or other surface, and the body is equal to zero. For instance, referring to FIG. 2*b*, the irregularly-shaped body of magnetic material comprised of a plate 103 has a plurality of distinct flux paths along legs 5, 6, 7 and 8 which limit apertures 104, 105 and 106. The plate 103 also may be of an irregular thickness. If the positive direction of flux flow through a plane surface *g—g'* which passes through the apertures 104, 105 and 106 is indicated by the arrow 108, and the negative direction of flux flow through this surface *g—g'* is indicated by the arrow 109, then (4) $$\phi_5+\phi_6+\phi_7+\phi_8=0$$

in which each $\phi_5$, $\phi_6$, $\phi_7$ and $\phi_8$ are respectively the fluxes flowing through the plane *g—g'* in the legs 5, 6, 7 and 8.

The flux configuration of an apertured plate can be changed by sending excitation currents through certain of the apertures, for example 104, 105, or 106 or FIG. 2*b*. However, the same relations of continuity of flux flow exist for the changing of the flux as exist for the flux itself because the condition of continuity always must be satisfied. The condition of continuity must be satisfied for any type of material, including a material having a high remanence. However, in order to simplify the discussion, leakage fluxes in the air are neglected herein, and the flux is considered to be confined to the magnetic material alone. The simplification is justified because apparatus may be designed or analyzed with sufficient accuracy for practical purposes on the basis of the simplification.

Referring to FIG. 2*c*, a magnetic body comprising an irregularly-shaped plate 12 is provided with apertures 13 and 14. The plate 12 also may be of a variable thickness. A current conductor 11 of *n* turns (each turn is shown in section) links the magnetic material limiting the aperture 13. A line integral of the magnetic field H along a closed line 16 is equal to the ampere-turns of the electric current passing through the area bounded by the line, or (5) $$ni=\oint Hds$$

where H is the magnetic field vector, and *ds* represents an elemental length of the closed line. Thus, for example, the line integral $\oint Hds$ along the closed line 16 surrounding the aperture 13 is equal to the ampere-turns of the current flowing through the conductor 11 which links the line 16. If no excitation current flows through the area bounded by the line 16, the line integral $\oint Hds$ is equal to zero. For example, the line integral $\oint Hds$ along a closed line 17 surrounding the aperture 14 is equal to zero because there is no current which links the line 17. That the integral is zero does not mean that the magnetic field itself is zero, as the magnetic field may change direction along the line 17.

The magnetic induction B is related to the magnetic field H in a manner most conveniently illustrated by a family of hysteresis loops. The entire family of major-minor hysteresis loops may be of importance in a particular application of the transfluxor. The flux configuration is determined by (1) the excitation currents; (2) the geometry of the material; (3) the major-minor hysteresis loops; (4) the previous history of the material, and (5) the two basic laws of continuity of flux and equality of the line integral of the magnetic field to the excitation current.

For the moment, assume that the magnetic material exhibits ideal rectangular hysteresis characteristics. That is, the hysteresis loops are assumed to be perfectly "rectangular" such as the idealized major loop shown in FIG. 3*a*. *Hc* is the symbol for the critical value of magnetizing force. At a value of +*Hc*, the magnetic material, if at state N of saturation, reverses to the other state P of saturation; at a value of −*Hc*, the magnetic material, if then at state P of saturation, reverses to the state N of saturation.

Referring to FIGS. 3*b* and 3*c*, a single apertured magnetic body 19 is fabricated from magnetic material assumed to be characterized by perfectly rectangular hysteresis loops. The single aperture 18 is limited by the leg 19 on one side and by leg 20 on the other side. The magnetic body 29 is linked by the winding 21 which is connected to a source of excitation current (not shown). The winding 22 links a portion of the magnetic material, as shown.

If, now, a positive excitation current is applied to the winding 21 in the direction of arrow *h*, a clockwise flux flow (as viewed in the drawing) is produced. Upon removal of the positive excitation current, the legs 19 and 20 are saturated in the state P of saturation at remanence. The clockwise sense of flux flow in the legs 19 and 20 is indicated by the solid arrows 23 and 24. Now, if a negative excitation current is applied to the winding 21 in the direction of arrow *h'*, a counter-clockwise flux flow is produced. Upon removal of the negative excitation current, the state of saturation at remanence of the legs 19 and 20 is reversed from the state P to the state N. The counter-clockwise sense of flux flow in the legs 19 and 20 is indicated by the dotted arrows 25 and 26.

The state of saturation at remanence of the legs 19 and 20 is reversed repeatedly by the application of alternate positive and negative excitation currents to the winding 21. A change of flux from one of the clockwise or counterclockwise senses to the other induces a voltage in the coupled winding 22.

Consider the flux configuration of the magnetic body 29, as shown in FIG. 3*c*, in which it is supposed that somehow one leg 19 is at a state P of saturation at remanence, resulting from a flux flow in the clockwise sense, as indicated by arrow 23, the other leg 20 is at a state N of saturation at remanence resulting from flux flow in the counterclockwise sense, as indicated by arrow 26. Now, if a positive or negative excitation current is applied to winding 21, no change of flux is produced because the leg 19 already is saturated in the clockwise sense and the leg 20 already is saturated in the counterclockwise sense. Consequently, the back and forth or A.C. excitation current applied to winding 21 does not induce a voltage output in secondary winding 22.

Therefore, if it were possible to saturate the legs 19 and 20 selectively in the same state of saturation at remanence, or in opposite states of saturation at remanence, as indicated in FIGS. 3*b* and 3*c*, respectively, then the single-aperture magnetic circuit would be able to control the flux flow so as to produce, or not to produce, an output voltage in winding 22 in response to the excitation currents applied to the winding 21. This simple arrangement of FIG. 3*b* or 3*c* then would operate as a transfluxor. However, it is apparent from the theory expounded that the flux configuration of the magnetic circuit shown in FIG. 3*c* violates the condition of continuity of flux flow because the algebraic sum of fluxes through the surface indicated by the line *k*—*k'* is not equal to zero.

The condition of continuity of flux flow likewise would be violated if the two legs 19 and 20 of the magnetic circuit of FIG. 3*c* were each saturated in the states of saturation at remanence opposite from those shown, with the leg 19 at a state N and the leg 20 at a state P of saturation at remanence. While it is impossible in principle to saturate the legs of a single-aperture magnetic circuit in opposite states of saturation at remanence along a selected path, such saturation is readily accomplished in accordance with the present invention in a transfluxor having at least two apertures.

For example, in connection with FIG. 1*b*, observe the states of saturation of the legs 2 and 3 in each case with reference to the intermediate aperture 34 of the transfluxor described. In one case, the legs 2 and 3 are saturated in the same state of saturation at remanence with respect to the aperture 34, that is, with respect to the selected path immediately about the aperture 34 as shown by the dotted arrow in the leg 2 and the solid arrow in the leg 3. On the other hand, in the other case, the legs 2 and 3 are saturated in opposite states of saturation at remanence with respect to the intermediate aperture 34, as shown by the solid arrows in the legs 2 and 3. Thus, by selectively applying a positive or a negative excitation current to the winding 33, the legs 2 and 3 are selectively saturated in the same or opposite states of saturation at remanence with reference to the intermediate aperture 34.

Practical materials deviate somewhat from the ideal material which has been assumed to have perfectly rectangular hysteresis loops. However, with actual materials having non-ideal rectangular hysteresis loops, the rectangularity of the loops is sufficient to provide the desired results in practice. FIGURE 1*c* is a graph of the major hysteresis loop of a typical sample of the rectangular hysteresis loop magnetic material used in fabricating a transfluxor.

Referring to FIG. 1*b*, assume that an excitation current in the direction of arrow *a'* is applied to winding 33 to set up the flux configuration shown by the solid arrows in the legs 2 and 3, with leg 2 at a state P of saturation at remanence and leg 3 at a state N of saturation at remanence with reference to aperture 34. Because the legs are substantially equal in cross-sectional width, the hysteresis loop for leg 2 is substantially identical to the hysteresis loop for leg 3. The hysteresis loops for the legs 2 and 3 are superimposed and become the hysteresis loop of FIG. 1*c*. The point $P_1$ of FIG. 1*c* represents the state of saturation of leg 2 and the point $N_1$ represents the state of saturation of leg 3. Thus, if an excitation current is applied to winding 35 in the direction of arrow *b* so as to produce a clockwise magnetizing force which tends to establish a clockwise flux flow, then the magnetizing force tends to magnetize both legs 2 and 3 towards the state P with reference to aperture 34. The magnetomotive force equation for a plate of uniform thickness can be expressed as follows:

$$ni_R = H_2 + H_3 \qquad (6)$$

where the term $ni_R$ is the ampere-turns linking the flux path around aperture 34; is the length of the flux path along the leg 2 or along the leg 3, both legs being of equal length; and $H_2$ and $H_3$ are, respectively, the magnetizing forces applied to the legs $H_2$ and $H_3$. The effect of the magnetizing force on the legs 5 and 6, which also are a part of the magnetic material limiting the aperture 34, is neglected in the above equation but may be considered as being incorporated with either one or the other, or both, of the legs 2 and 3, if desired.

Referring again to FIG. 1*c*, the changes in flux $\Delta\phi_2$ and $\Delta\phi_3$ produced in legs 2 and 3, respectively, must be equal because the flux flow is continuous; that is, $$\Delta\phi_2 = \Delta\phi_3 \qquad (7)$$

The changes in flux flow in the legs 1 and 4 are neglected for the reason that the amplitude of the excitation current applied to winding 35 is assumed to be insufficient to cause any appreciable flux flow around those longer flux paths which encompass the aperture 34 along with either one or both of the apertures 32 and 36.

In order to satisfy both the magnetomotive Equation 6 and the flux change Equation 7, the magnetic fields take values $H_2$ and $H_3$ shown in FIG. 1*c*. If the hysteresis loop were perfectly rectangular (i.e., the legs perfectly saturated), then $\Delta\phi_2 = \Delta\phi_3 = 0$. The magnetic field $H_3$ also would be equal to zero, and $lH_2$ would be equal the ampere-turns $ni_R$. However, with imperfect, actual materials, the small changes in flux $\Delta\phi_2$, $\Delta\phi_3$ are not equal to zero. Even if the polarity of the excitation current applied to winding 35 of aperture 34 is reversed, no, or at most a small, change of flux results. Therefore, back-and-forth excitation of the magnetic material limiting aperture 34 produces no appreciable change of flux on leg 6, hence no, or at most a small, voltage is induced in the output winding 39 which links leg 6.

Now consider the condition where the legs 2 and 3 are both saturated in the N state of remanence with respect to aperture 34. When an excitation current in the direction *b* is applied to the winding 35, there is a change from the state N of saturation at remanence, represented by the point $N_1$ of FIG. 1*c*, for both the legs 2 and 3, to a state P of saturation. Thus, the change of flux $\phi_0$, after the excitation force returns to zero, may be represented by the distance between the points $N_1$ and $P_1$, FIG. 1*c*. This latter change of flux $\phi_0$ is much greater than either value $\Delta\phi_2$ or $\Delta\phi_3$. Consequently, signals induced in the output coil 39 by the change of flux $\phi_0$ are readily distinguished from the smaller signals induced by $\Delta\phi_2$ or $\Delta\phi_3$. Discrimination against the latter signals may be made substantially complete.

In considering the hysteresis loop diagram of FIG. 1*c* heretofore, the convention was adopted that when the sense of saturating flux flow in the flux path around aperture 34 was clockwise, the state of saturation was P and, conversely, when the sense of saturating flux flow in the flux path around aperture 34 was counter-clockwise, the state of saturation was N. The flux changes may also be considered by using the convention that positive and negative directions of flux flow exist through a surface which intersects some or all of the apertures of a magnetic body, such as the plane surface represented by the line *g—g′* in FIG. 2*b*. The latter convention leads to a simple, graphical construction of flux changes. For instance, FIG. 1*d* illustrates a graphical method of determining the flux flow conditions through the two legs 2 and 3 of the magnetic circuit when the direction of flux flow in the two legs is the same. When both legs 2 and 3 are magnetized, as shown by the solid arrows of FIG. 1*b*, the direction of flux flow in each of the two legs is positive, and the state of saturation at remanence of each leg represented by a point such as the point P′ of FIG. 1*f*. The hysteresis loops for the legs 2 and 3 are substantially identical, and the hysteresis loop of FIG. 1*d* may be considered as the hysteresis loop for one leg superimposed upon that for the other. Suppose that a magnetizing force in the clockwise sense (current in the direction *b*) is applied to the winding 35 of FIG. 1*b*. This force shifts the point representing in FIG. 1*d* the magnetic state of the leg 2 from the position P′ in a positive direction along the hysteresis loop. At the same time, this force shifts the point representing the magnetic state of the leg 3 from the position P′ in a negative direction along the hysteresis loop. It is a condition of the magnetic circuit that the sum of the magnetizing forces be equal to the driving ampere turns *ni*, as in the case for Equation 6. Proper weighing factors relating to the lengths of the legs should be employed. In the instant case, the factors are unity because the legs 2 and 3 are equal. Therefore, the sum of the magnetizing forces is the sum of the magnetic fields $H_2$ and $H_3$. A second condition of the magnetic circuit is that the values for change of flux must be equal, Equation 7. Therefore, graphically, a point is found on the hysteresis loop to the left of P′ and another point to the right of P′ satisfying the two conditions, as illustrated in FIG. 1*d*. The graphical method of flux determination can be extended to more legs, if desired.

Referring to FIG. 1*b*, it is now apparent that the response in the output winding 39 to the excitation current applied to the winding 35 can be considered to depend upon the states of saturation at remanence of legs 2 and 3. A relatively high-level response is obtained when both legs have the same state of saturation along a flux path around aperture 34. A negligible, or relatively low-level, response is obtained when both legs have opposite states of saturation with reference to the aperture 34. The reference excitation current applied to winding 37 and the current applied to winding 33 control whether the legs 2 and 3 have the same or opposite states of saturation with reference to the aperture 34.

The magnetic material limiting aperture 36 may be saturated initially in a reference state, for example, in the state P with clockwise flux flow with reference to the aperture 36. Leg 4 may then remain saturated in the reference state of saturation at remanence, with a downward (negative) direction of flux flow. The response to the excitation applied to winding 35 is indicative of the state of saturation at remanence of leg 1. The excitation of the magnetic material limiting aperture 34 leaves the state of saturation at remanence of leg 1 unaltered under the conditions set out hereinbefore. Therefore, the transfluxor can be used for storing a binary digit where the states (P and N) of saturation at remanence of leg 1 respectively represent a binary one and a binary zero, or vice versa. For example, a binary one can be written into the transfluxor by applying a positive excitation current to winding 33 of aperture 32 to establish leg 1 in a state P of saturation at remanence with reference to aperture 32. A binary zero can be written into the transfluxor by applying a negative excitation current to winding 33 to establish leg 1 in a state N of saturation at remanence. The stored information is then read out of the transfluxor by applying a positive excitation current to winding 35 of aperture 34 and observing the voltage induced in winding 39. A relatively high voltage indicates a binary one is stored, and a relatively low, or no, voltage indicates a binary zero is stored in the transfluxor. In practical circuits, the high voltage may be five or more times greater in amplitude than the small voltage.

The read-out can be termed "non-destructive" because it leaves the stored information available to be read repeatedly by excitation of winding 35. However, the flux of legs 2 and 3 is, in fact, changed to obtain the read-out signal. The voltage induced in the output winding 39 is due to the change of flux in legs 2, 3, 5 and 6. Nevertheless, the original states of the changed legs 2, 3, 5 and 6 are restored by applying an opposite (negative) excitation to winding 35 of aperture 34. The negative excitation current is applied to winding 35 regardless of whether a read-out signal indicates a binary one or a binary zero. In the case of a binary zero, neither the positive nor the negative excitation current applied to winding 35 of aperture 34 changes the states of saturation at remanence of the legs 2 and 3.

Another way of describing the effect is to consider the information digit as being stored in the leg 2 rather than the leg 1. The information digit is written in the leg 2 by applying an excitation current to the winding 33 of the aperture 32 which leaves the state of saturation at remanence of the leg 3 unaltered. Thus, when an A.C. excitation current is applied to the winding 35 of the aperture 34, the state of saturation at remanence of the leg 2 is either reversed or not. If the saturation of the leg 2 is reversed by either one of the phases, then its original state of saturation is restored automatically on the next phase, without need for any feedback circuitry, thereby insuring an effective, non-destructive read-out. On the other hand, if the saturation of the leg 2 is not reversed by the one phase, then, on the next phase, the opposite excitation leaves its state of saturation unaltered. Therefore, the leg 2 is subjected to the unconditional restoring excitation without losing the information stored therein. The latter way of looking at the phenomena is the more realistic, because the state of saturation at remanence of leg 1 plays no role, per se, in the read-out process. Leg 1 is significant in allowing the setting of leg 2 to a state of saturation at remanence without changing the state of saturation at remanence of leg 3. From another viewpoint, however, leg 1 provides a bypass or shunt magnetic circuit for the flux. After leg 2 is set to a state of saturation at remanence, the magnetic state of leg 1 may be changed by still another aperture o the left of aperture 32, and the reading effects, inso-'ar as aperture 34 is concerned, would remain unaltered.

The controlled excitation current which is passed hrough aperture 34 may be an indefinite sequence of ›airs of positive and negative current pulses, that is, an \.C. signal, which terminates upon a complete cycle. The 'esulting read-out signal then exists indefinitely for one ›ense of flux flow around aperture 34 and is essentially :ero for opposite senses of flux flow around the aperture }4. The pairs of positive and negative current pulses ıeed not be regularly spaced in time.

Both electronic flip-flops and magnetic toroids or cores ıave been employed for storing binary digits. The flip-lop is able to furnish a continuous indication of the tored information, but requires a continuous holding ›ower while performing the storing function because one ›r the other of its tubes must be fully conducting. The nagnetic toroids can store information indefinitely with-›ut requiring holding power. However, the information ›tored in a toroid is destroyed by the very process of 'eading it out, and if the information is to be retained, ın extraneous feed-back circuit is required. Thus, the ransfluxor has the advantages of both the electronic lip-flops and the magnetic toroids. The transfluxor can ›tore information indefinitely without requiring holding ›ower, and the information stored in the transfluxor can ›e repeatedly read out without destroying it.

An important property of the magnetic system de-›cribed in connection with FIG. 1b is that the write-in ınd read-out information are independent. That is, the vrite-in resulting from the application of an excitation :urrent to the write-in winding 33 of aperture 32 does ıot cause a voltage to be induced in output winding 39 ›ecause the flux flow is confined to the magnetic material imiting aperture 32. Similarly, the interrogating cur-:ents applied to winding 35 of aperture 34 do not cause ı voltage to be induced in the write-in winding 33 because he flux flow is confined to the magnetic material limiting ıperture 34.

IMPROVED SIGNAL-TO-NOISE RATIO

In the operation described above, if the voltage induced in the output winding 39 when the flux configuration of the magnetic system is as indicated in FIG. 1b by the solid line arrows, and corresponding to the change of flux $\Delta\phi_2=\Delta\phi_3$, this voltage results in an unwanted or "noise" signal. This noise signal is due to the imperfectly rectangular hysteresis characteristics of the magnetic material.

This output noise signal may be at least partially can-celled in the transfluxor by arranging the winding 39 to link both of the legs 3 and 4, as shown in FIG. 4a, or to link the three legs 3, 4 and 7, as shown in FIG. 4b. In the embodiment of FIG. 4a, the output winding 39 may be threaded downwardly through the aperture 34, then in back of the leg 3, then upwardly through the aperture 36, then around the leg 4, and again upwardly through the aperture 36. In the embodiment of FIG. 4b, the output winding 39 is threaded downwardly through the aperture 32, behind and around the leg 7, downwardly through the aperture 34, behind the leg 3, then upwardly through the aperture 36, then around the leg 4, and finally upwardly through the aperture 36 again. The cancellation of noise in the embodiment of FIG. 4a arises from the fact that the changes of flux in legs 3 and 4 induce cancelling voltages in the output winding 39. In the arrangement of FIG. 4b, an additional noise-cancelling voltage is induced in the output winding 39 due to the linking of the leg 7 thereby. Although the noise cancellation with the arrangements of FIGS. 4a and 4b is only partial, because most of the flux flows directly around the aperture 34, these arrangements, in practice, improve the signal-to-noise ratio markedly. A good signal-to-noise ratio is also obtained by arranging the output winding 39 to link the leg 3 only, as shown in FIG. 4c. For this purpose, the winding 39 is threaded downwardly through the aperture 34, behind the leg 3, and then upwardly through the aperture 36. In the arrangement of FIG. 4c, the flux changes in the legs 1 and 4 do not contribute to the voltage induced in the winding 39, and hence do not affect the output signal.

TWO-APERTURE TRANSFLUXOR

The aperture 36 of the three-aperture transfluxor of FIG. 1b is a dummy aperture and plays the role of a reference in the case of the three-aperture transfluxor. Referring to FIG. 5a, there is shown a two-aperture transfluxor fabricated of a rectangular plate 40 of substantially homogeneous magnetic material characterized by a substantially rectangular hysteresis loop. The plate 40 has two apertures 41 and 42, to provide a center leg 50 and side legs 49 and 51. The cross-sectional widths of the leg 51 along the line $e$—$e'$ through the centers of the apertures 41, 42 are equal to, or greater than, the sum of the cross-sectional widths of the side legs 49 and 50 along the same line. The cross-sectional widths $w_1$ and $w_2$ (FIG. 5b) of the top and bottom links 52 and 53 which connect the side legs 51 and 52 are each equal to the cross-sectional width (along the line $e$—$e'$) of leg 51. It is not necessary that the plate be of a uniform thickness, although for convenience FIG. 5b shows the thickness ($t_2$) to be uniform. A winding 43 links the magnetic material limiting the aperture 41, and a different winding 44 links the magnetic material limiting the aperture 42. The winding 43 is connected to a pulse source 47, and the winding 44 is connected to an A.C. source 46. An output winding 45 links the magnetic material comprising the middle leg 50, and a load device 48 is connected across the winding 45. A winding 43a links the material limiting the aperture 42. The winding 43a is also connected to the pulse source 47. In FIG. 5a, current flow in the windings 43, 43a, and 44 is taken as positive when in the direction of the arrows adjacent the respective windings.

The two-aperture transfluxor is capable of several different modes of operation, for example, either to transmit or to block signals. Two such modes will now be described in accordance with the following outline:

*Mode I*

(a) Transfluxor in signal-passing condition
(b) Transfluxor in signal-blocking condition

*Mode II*

(a) Transfluxor in signal-passing condition
(b) Transfluxor in signal-blocking condition

OPERATION OF TWO-APERTURE TRANSFLUXOR

*Mode I*

(a) TRANSFLUXOR IN SIGNAL-PASSING CONDITION

In the first mode, the windings 43 and 43a, through the aperture 41, are used for controlling the response to the input signal furnished by the A.C. source 46. The output of an A.C. source 46 is applied to the winding 44 which is located between the narrow middle leg 50 and the wide leg 51. Initially, assume that a relatively intense negative excitation current is applied by the pulse source 47 to the winding 43a, thereby establishing a counter-clockwise flux flow in the flux path around the aperture 42. Because of the intensity of this negative excitation current, a flux flow in the counter-clockwise sense with reference to the aperture 42 is also established in the narrow side leg 49. The sense of flux flow is shown by the solid arrows. When the intense negative excitation current is terminated, the narrow legs 49 and 50 are in a state N of saturation at remanence and the leg 51 in a state P of saturation at remanence with reference to the direction of flux flow through a horizontal plane represented by the center line $e$—$e'$. The states of saturation at remanence of the three legs 49, 50 and 51 are conveniently represented by points on their respective, somewhat idealized hysteresis loops shown in FIGS. *5c*, *5d* and *5e*. These three hysteresis loops correspond to the magnetic characteristics of the legs 49, 50 and 51, respectively. After the relatively intense negative excitation current of winding 43*a* is terminated, the legs 49, 50 and 51 are in states represented by the points 1–1, 2–1, and 3–1 on their respective hysteresis loops. The flux continuity relation for the transfluxor of FIG. *5a* may be expressed as:

$$\phi_{49}+\phi_{50}+\phi_{51}=0 \tag{8}$$

where $\phi_{49}$, $\phi_{50}$ and $\phi_{51}$ are the algebraic values of the fluxes passing through the surface of the horizontal plane *e—e'* in the respective legs 49, 50 and 51.

The hysteresis loop of FIG. *5e* for the wide leg 51 is not as rectangular as those of FIGS. *5c* and *5d* for the narrow legs 49 and 50 because the value of magnetizing force H is less uniform for the wide leg 51 than for the other two legs. The strength of the magnetizing force H is greater near aperture 42 and weaker farther out. As previously noted, the closed line integral of the magnetic field is equal to the ampere-turns of the electric current passing through the area bounded by the line. Accordingly, if the lines of the magnetic field are considered to be circular, then the magnetizing force varies inversely with the radial distance from the winding 44, which explains the lesser intensity of field for the wide leg 51.

The hysteresis loops for the legs 49 and 50 are shown to differ somewhat in height along the $\phi$ axes because initially the magnetizing force exerted on the leg 49 is less than the magnetizing force exerted on the leg 50 when an excitation current is applied to the magnetic material limiting the aperture 42.

Assume, now, that a positive excitation current is applied to the winding 44 by A.C. source 46. This positive excitation current is restricted to an amplitude much less than the initial negative excitation current. By "much less" is meant, for example, from a third to a quarter of the initial value of negative excitation current in the winding 43*a*. As a result of this relatively weak, positive excitation current in the winding 44, the saturating flux in the leg 50 reverses from the counter-clockwise sense to the clockwise sense with reference to the aperture 42. The clockwise saturating lines of flux in the leg 51 either diminish or reverse to an extent sufficient to satisfy the basic flux continuity equation. Now, the states of saturation of the narrow legs 50 and 51 are represented by the points 2–2 and 3–2 on their respective hysteresis loops, as shown in FIGS. *5d* and *5e*, but the leg 49 remains in the state N of saturation at remanence represented by a point 1–2 at or very close to the point 1–1 on its hysteresis loop of FIG. *5c*. Thus, the flux is balanced at remanence, that is, the flux flow Equation 8 is satisfied, by reversing the flux flow to the P direction in the leg 50 and decreasing or reversing the flux flow in the leg 51. The leg 49, however, changes its state of saturation at remanence slightly, if at all, because it is subjected only to a slight positive magnetizing force which may cause a small clockwise flux flow due to the imperfect rectangularity of the hysteresis loop of the magnetic material. The difference in flux ordinates between the points 3–1 and 3–2 of FIG. *5e* for the leg 51 is substantially equal to a line difference between the points 2–1 and 2–2 of FIG. *5d* for the leg 50.

During the change of flux in the legs 50 and 51 just described, a voltage is induced in the output winding 45 which links the leg 50. Thereafter, a positive excitation current in the winding 44 is followed by a negative excitation current. The states of saturation of the legs 50 and 51 change again and now may be represented by the points 2–3 and 3–3, respectively, on the hysteresis loops of FIGS. *5d* and *5e*. The points 2–3 and 3–3 are substantially the same as the points 2–1 and 3–1, respectively. The intensity of the subsequent positive and negative excitation currents in the winding 44 may be maintained at a suitable value below that at which the resultant magnetizing force causes an appreciable flux flow in the leg 49. With each of the negative excitation currents applied to the winding 44, some additional counter-clockwise flux does flow in the leg 49. However, when the negative excitation current in the winding 44 is terminated, the leg 49 resumes, substantially, its initial state of saturation at remanence because the change from the state N of saturation to increased saturation in the N direction and return is substantially reversible. During these reversals, a point representing the magnetic state of the leg 49 describes a minor hysteresis loop that includes the points 1–1, 1–2, and 1–3.

The reversals of the states of saturation at remanence of the legs 50 and 51 can now be repeated indefinitely. In that event, the magnetic states of the legs 50 and 51 alternate between states represented by the points 2–1, 2–3 and 3–1, 3–3, respectively. Meanwhile, the leg 49 remains in the magnetic state represented by a point at or near the point 1–1, as just explained. An output voltage is induced in the output winding 45 during each reversal of flux in the leg 50 and, consequently, an A.C. output voltage is supplied to the load device 48.

OPERATION OF TWO-APERTURE TRANSFLUXOR

*Mode I*

(*b*) TRANSFLUXOR IN SIGNAL-BLOCKING CONDITION

Assume, now, that after the negative excitation current in winding 43*a*, a relatively intense positive excitation current is applied to the winding 43 by the pulse source 47. The intensity of this last, positive excitation current applied to the winding 43 is sufficient to establish a clockwise flux flow around the longer flux path indicated by the dotted line 56 which encircles both the apertures 41 and 42. When this intense, positive excitation current is terminated, the side legs 49 and 51 are, respectively, in states of saturation at remanence represented by points 1–4 and 3–4 on the hysteresis loops of FIGS. *5c* and *5e*. The state of saturation at remanence of the leg 50 remains unchanged because the leg 50 is already saturated in the N state, with flux flowing in the clockwise sense with reference to the aperture 41. Thus, the state of saturation at remanence of the leg 50 remains at N, as represented by the point 2–4 of FIG. *5d*.

Now, when the relatively weak, positive excitation current is applied to winding 44 of aperture 42, substantially no change of flux occurs in any leg. The lack of change of flux is due to the fact that the leg 49 is already saturated in the clockwise sense with reference to the aperture 42, so that any change of flux in the leg 50 would require a corresponding change in leg 51. However, leg 51 is already in a state of saturation at remanence (for example, such as state 3–4 as shown on the hysteresis loop diagram of FIG. *5e*). The state 3–4 is a saturated state even though the flux flow in this state of remanence is close to, or even equal to zero. If, then, an attempt is made to magnetize leg 51 negatively (leg 51 being in the state corresponding to the point 3–4), very little change of flux occurs, and whatever change does occur is almost entirely reversible. It appears that operation is along one of the minor rectangular hysteresis loops. Actually, because the hysteresis loops are not perfectly rectangular or, in other words, because the saturation effect is not perfect, the legs 50 and 51 do change slightly and assume states represented by the points 2–5 and 3–5, as shown in FIGS. *5d* and *5e*.

If the relatively weak, positive excitation current pulse applied to the winding 44 is followed by a relatively weak negative excitation current pulse, then again substantially no change of flux occurs. In this latter situation, the center leg 50 does not change state because it is already saturated with flux in the counter-clockwise sense with reference to the aperture 42. The side legs 49 and 51 can only change with a stronger excitation current exerting a magnetomotive force around the longer flux path 56 of FIG. 5*a*. Therefore, ideally, with the relatively weak, negative excitation current, no change occurs. As a practical matter, however, due to the imperfect rectangularity of the hysteresis loops, small, minor hysteresis loops are described. States corresponding to the points 2–6 and 3–6 of FIGS. 5*d* and 6*e*, which are substantially equivalent to the states 2–4 and 3–4, respectively, are now assumed by the legs 50 and 51. A train of positive and negative excitation current pulses applied to the winding 44 of the aperture 42, therefore, induces very little, or no, output voltage in the output winding 45. The initial states of saturation of the legs 49, 50 and 51 may now be reproduced by applying a relatively intense, negative excitation current to the winding 43*a*. The legs 49, 50 and 51 are then saturated again at the states represented by the points 1–1, 2–1 and 3–1 on the hysteresis loops of FIGS. 5*c*, 5*d* and 5*e*. Thus, following the initial negative setting excitation current pulse applied to the winding 43*a*, the magnetic system of FIG. 5*a* does, or does not, furnish an output signal in the output winding 45 in response to a subsequent train of weaker positive and negative excitation current pulses depending upon the control signal applied to winding 43. When a positive excitation current pulse is applied to winding 43, a very small, or no, voltage is induced in the output winding 45. Note that the positive excitation current pulses applied to the winding 43 do not cause a flux flow in the leg 50, and hence no output voltage is induced in the winding 45 which links the leg 50. Therefore, the control circuit and the controlled circuit are virtually independent of each other. The control excitation current in the two-aperture transfluxor of FIG. 5*a* are larger in amplitude than those required for the three-aperture transfluxor because the amplitude of the control excitation currents should be sufficient to establish a saturating flux flow around the longer flux path 56 (FIG. 5*a*).

The two-aperture transfluxor may also be used for storing binary information. For this purpose, the signal transmitting condition of the transfluxor resulting from application of the negative setting current applied to the winding 43*a* may correspond to a binary one. The signal-blocking condition of the transfluxor resulting from the positive excitation current applied to the winding 43 may correspond to a binary zero. The winding 44 may be employed, instead of the winding 43*a*, to apply an intense, negative excitation current to place the transfluxor in the binary one condition. If desired, the pulse source 47 may be a binary device, for example, a flip-flop circuit, connected to apply a positive pulse to the winding 43 when assuming one binary state and to apply a negative pulse to the winding 43*a* when assuming the other binary state. The transfluxor then assumes one condition or the other corresponding to one binary state or the other of the pulse source 47.

The stored binary information can be read out by applying a positive and negative sequence of excitation pulses to the winding 44 and observing the voltage induced in the output winding 45. When a binary zero is stored a small, or no, change of flux flows in the leg 50; hence, a small, or no, voltage is induced in the winding 45. When a binary one is stored, a flux change is produced for each excitation pulse of the sequence, and a relatively large voltage is induced in the winding 45. The read-out may be continued for an indefinitely long sequence of reading excitation current pulses without destruction of the stored information.

Ideally, the two-aperture transfluxor does not respond to an excitation current applied to the winding when the states of saturation of the legs 49, 50 and 51 correspond to the points 1–4, 2–4 and 3–4, respectively, as illustrated on the hysteresis loops of FIGS. 5*c*, 5*d* and 5*e*. However, it is probable that some change of flux is produced in the wide leg 51 by the relatively weak excitation currents of the winding 44 because of the imperfect rectangularity of the hysteresis loops. During these weak excitation currents, a point representing the magnetic state of the wide leg 51 describes a minor hysteresis loop 120 of FIG. 5*e*. This change of flux is perhaps larger than that which would occur if the leg 51 were narrow and fully saturated at state N of saturation of remanence. In any event, as explained in connection with a similar change of flux in the magnetic system of FIG. 1*b*, this change in flux results in a noise signal.

It is possible to improve the signal-to-noise ratio in the two-aperture transfluxor by a modification such as shown in FIG. 5*f*. This modification involves splitting the wide leg 51 by a third aperture 61 to provide a fourth leg 62 in the plate 40 such that all of the legs 49, 50, 51, and 62 are of equal width. A flux fixed in direction and magnitude is established in the leg 62 by applying a setting excitation current pulse to the winding 43*a* of the aperture 42. This setting excitation current pulse is sufficient in amplitude to produce a saturating flux flow around all of the apertures 41, 42 and 61.

Suppose, now, that a positive pulse is applied to the winding 43 of sufficient amplitude to reverse the states of saturation of the legs 49 and 51, but not sufficient to affect the state of saturation of the leg 62. The transfluxor of FIG. 5*f* is then in the signal-blocking condition. The leg 50 is already saturated in the clockwise sense with respect to the aperture 41. Moreover, because the last-mentioned positive pulse is not of sufficient amplitude to cause the flux to pass around the aperture 61, all of the change of flux in the leg 49 appears as a change of flux in the leg 51. Accordingly, the leg 51 is saturated substantially completely with substantial flow of flux in the clockwise sense around the aperture 41. Consequently, when alternate, weak positive and negative current excitation pulses are applied to the winding 44, the legs 50 and 51 are in opposite states of saturation with respect to the aperture 42. However, notice that the leg 51 now has a substantial flux flow. A point representing the magnetic condition of the leg 51 during the alternate positive and negative current pulses in the winding 44, therefore, describes a minor hysteresis loop near a point, such as point P, on a larger hysteresis loop. A minor hysteresis loop at the point P, which indicates a greater flow of flux, however, has less amplitude along the $\phi$ axis for a like amplitude along the H axis. Accordingly, less noise signal is induced in the output winding 45. The operation of the transfluxor of FIG. 5*f* in other respects will be understood by those skilled in the art from the preceding description of the transfluxor of FIG. 5*a*.

OPERATION OF TWO-APERTURE TRANSFLUXOR

*Mode II*

(*a*) TRANSFLUXOR IN SIGNAL-PASSING CONDITION

In explaining the operation of the transfluxors hereinbefore described, it was emphasized that the amplitude of the controlled or read-out output currents is limited to a certain definite magnitude. The limitation arises because the magnitude of the currents of the A.C. source should not be greater than that which establishes a flux flow in the relatively short path around one aperture. In the first mode, when it is desired to load the output circuit in order to obtain a relatively large output current, a correspondingly large excitation current would be needed on the unblocked condition. Such a large excitation current, however, in the blocked condition would exceed the limit mentioned above, and would cause flux flow in the longer path which would unblock the transfluxor. Therefore, such large loads and such large excitation currents are not used in the first mode.

The following described asymmetrical mode of operating a two-aperture transfluxor provides an output signal of a much larger amplitude than that for modes of operation described heretofore for like-size transfluxors. Referring to FIG. 6*a*, there is shown a two-aperture transfluxor similar to that of FIG. 5*a* having an output winding 54 instead of the output winding 45 of FIG. 5*a*. The output winding 54 links the leg 49 and is coupled to a load 55. Instead of the A.C. source being coupled to the winding 44, as in FIG. 5*a*, the winding 44 of FIG. 6*a* is coupled for polarity reversal through a double-pole, double-throw switch 58 to a battery 60, and a series resistance 125. A single-throw, single-pole switch 59 is interposed in the connection between the battery 60 and the switch 58. A pulse source 47*a* is connected to the winding 43. The winding 43*a* of FIG. 5*a* and the pulse source 47 need not be employed in the arrangement of FIG. 6*a*.

In operation, the arm of the reversing switch is thrown down (as viewed in the drawing), and the switch 59 is closed and opened, thereby to provide a negative excitation current pulse 64*a* (illustrated in FIG. 6*f*) to the winding 44 of FIG. 6*a*. A flux flow is established in the legs 49, 50 and 51 in the counter-clockwise sense about the aperture 42. The points J–1, K–1 and L–1 represent the states of saturation at remanance of these legs on the respective hysteresis loop diagrams of FIGS. 6*b*, 6*c* and 6*d*. The pulse source 47*a* supplies to the winding 43 a sequence of current pulses of waveform 63 (FIG. 6*e*). The waveform 63 consists of an intense, positive excitation current pulse 63*a* followed by a weak, negative excitation current pulse 63*b*. The direction of flux flow in FIG. 6*a*, as distinguished from the sense of flux flow around the apertures, is taken with respect to the horizontal plane *f*—*f'* through the apertures 41 and 42.

The first positive pulse 63*a* establishes a clockwise flux flow with reference to the aperture 41 in the longer path 56 about both of the apertures 41 and 42. Accordingly, after the first pulse 63*a* is terminated, the leg 49 is in a state P of saturation at remanance represented by the point J–2 of FIG. 6*b*; the leg 50 is in a state N of saturation at remanence represented by the point K–2 of FIG. 6*c*, because the sense of flux flow in leg 50 is already clockwise with reference to the aperture 41; and the leg 51 is at a state of saturation at remanance near zero flux flow represented by the point L–2 of FIG. 6*d*. The intensity of the current pulse 63*a* (FIG. 6*e*) is not only sufficient to provide the saturating lines of flux along the longer path 56 (FIG. 6*a*) which encircles both apertures 41 and 42, but also to counterbalance the demagnetizing tendency of the output current induced in the output winding 54.

The next succeeding weak, negative excitation current pulse 63*b* (FIG. 6*e*) establishes a counter-clockwise flux flow about the aperture 41 (FIG. 6*a*). After this current pulse 63*b* is terminated, the legs 49 and 50 are in states N and P of saturation at remanance, respectively, represented by the points J–3 and K–3 of FIGS. 6*b* and 6*c*. The leg 51 is in a state of saturation at remanance represented by the point L–3 of FIG. 6*d*, substantially without change, because the intensity of the negative pulse is insufficient to establish a flux flow about the longer path 56 of FIG. 6*a*. The saturation states of the legs 49 and 50 are reversed.

During a reversal of the flux in the leg 49 from a clockwise to a counter-clockwise sense of flux flow, an output voltage is induced in the output winding 54 and which is capable of producing a demagnetizing load current. In order to insure that the less intense, negative excitation current pulse provides sufficient magnetizing force to reverse the sense of flux flow in the legs 49 and 50 in spite of the demagnetizing load current, the rise time of the power-producing pulse 63*a* (FIG. 6*e*) and also, as a practical matter, the decay time is made much shorter than that of the negative excitation current pulse 63*b*. The rise and decay times of either the pulse 63*a*, or the pulse 63*b*, may be, but need not be, the same. However, the leading edge of either pulse is more significant than the trailing edge of the same pulse, because the trailing edge terminates the pulse and leaves the magnetic material in a state of saturation at remanence, whereas the leading edge causes reversal of the magnetic state of the material and supplies the load current.

A new power pulse 63*a* again establishes a clockwise flux flow in the legs 49 and 50 with respect to the aperture 41, and these legs assume the states P and N of saturation at remanence, respectively, represented by the points J–4 and K–4 of FIGS. 6*b* and 6*c*. Also, the magnetic state of the leg 51, represented by the point L–4 of FIG. 6*d*, is practically unaltered. Thus, the legs 49, 50 and 51 are returned to substantially the same states of saturation as existed immediately after the previous, positive power pulse which was applied to the winding 43 (FIG. 6*a*). A subsequent, relatively weak, negative excitation pulse 63*b* (FIG. 6*e*) again establishes a counter-clockwise flux flow in the path 57 (FIG. 6*a*) around the aperture 41. The legs 49, 50 and 51 are now in the states of saturation represented, respectively, by the points J–5, K–5 and L–5 of the respective hysteresis loops of FIGS. 6*b*, 6*c* and 6*d*.

It is therefore apparent from the foregoing that, after the initial, negative setting pulse has been applied to the winding 44, the effect of the sequence of a positive power pulse, followed by a less intense negative pulse, is to reverse the sense of saturating flux flow in the leg 49 for both the positive and the negative pulses, and to supply to the load 55, for each positive pulse, a relatively large output current pulse.

The flux in the leg 51 changes by a substantial amount only at the first positive pulse applied to the winding 43. For all subsequent positive and negative pulses applied to the winding 43, for a change of flux in one of the legs 49 or 50, there is a substantially equal change of flux in the other one of these legs. There is, at the same time, only a small, or no, flux change in the leg 51. The points J–5, K–5 and L–5 of the respective hysteresis loops of FIGS. 6*b*, 6*c* and 6*d* represent, respectively, the states of saturation at remanence of the legs 49, 50 and 51 following any sequence of pairs of the positive and negative pulses.

OPERATION OF TWO-APERTURE TRANSFLUXOR

*Mode II*

(*b*) TRANSFLUXOR IN SIGNAL-BLOCKING CONDITION

Consider, now, the effect of a positive excitation current pulse which is applied to the winding 44 (FIG. 6*a*). The arm of the reversing switch 58 is thrown up (as viewed in the drawing) and the switch 59 is closed and opened, thereby to provide a positive excitation current pulse 64*b* (illustrated in FIG. 6*f*) to the winding 44 of FIG. 6*a*. A flux flow is established in the legs 49, 50 and 51 in the clockwise sense about the aperture 42. The points J–7, K–7 and L–7 represent the states of saturation at remanence of these legs on their respective hysteresis loops of FIGS. 6*b*, 6*c* and 6*d*. After a sequence of positive and negative current pulses applied to the winding 43 (FIG. 6*a*), these last-mentioned states may be assumed by these legs in a different manner. An intense, negative excitation current pulse may be applied to the winding 43. The legs 49, 50 and 51 are then in the states of saturation at remanence represented by the points J–6, K–6 and L–6 of the respective hysteresis loops of FIGS. 6*b*, 6*c* and 6*d*. Now, by applying an intense, positive excitation current to the winding 43, the legs 49, 50 and 51 are caused to assume the states of saturation represented, respectively, by the points J–7, K–7 and L–7. Thus, the states of saturation of the legs 49, 50 and 51 represented, respectively, by the points J–7, K–7 and L–7 are reached either from the states of saturation represented by the points J–5, K–5, L–5, or from the states represented by the points J–6, K–6 and L–6. In either event, the transfluxor of FIG. 6*a* is in a signal-blocking condition.

Assume, now, that the current waveform 63 of FIG. 6*e* is applied to the winding 43. The intense, positive current pulse 63*a* does not produce any substantial change of flux because a saturating flux in the clockwise sense with reference to the aperture 41 is established already in the legs 49 and 51. Therefore, no matter how intense the positive excitation current applied to the winding 43 may be, substantially no output voltage is induced in the output winding 54. However, the intensity of the subsequent negative excitation current pulse 63*b* (FIG. 6*e*) produces a magnetizing force tending to cause a counter-clockwise flux flow around the flux path 57. However, such a flux flow is not established because the legs 49 and 50 are saturated at remanence in opposite senses of flux flow with reference to the aperture 41. The law of continuity of flux flow would be violated, as discussed above in connection with FIG. 1*c*, if a saturating flux flow were established by the negative excitation current pulse. Actually, small, minor hysteresis loops are described by the points instantaneously representing the magnetic states of the legs 49 and 51 which finally reach the states represented by the points J–9 and L–9 on the hysteresis loops of FIGS. 6*b* and 6*c*. The minor hysteresis loops occur because the material has imperfectly rectangular saturation characteristics. A repetition of the application of the sequence of the excitation pulses 63*a* and 63*b* shown in FIG. 6*e* to the winding 43 (FIG. 6*a*) does not produce any reversals of flux previously established in leg 49. Therefore, substantially no output voltage is induced in the output winding 54.

The operation of the two-aperture transfluxor in response to the sequence of the asymmetric excitation current pulses depends upon the ratio between the length of the flux path 56 to the length of the flux path 57. The larger this ratio is, within reasonable limits, the less critical is the amplitude of the smaller pulse 63*b*, FIG. 6*c*. Furthermore, the frequency of the output pulses may be made greater because a pulse 63*b*, of greater amplitude than just sufficient to reverse the flux in the shorter path 57, FIG. 6*a*, may be applied, whereupon the flux reverses more quickly than with a pulse 63*c* of smaller amplitude.

OTHER FORMS OF TRANSFLUXORS

The two-aperture transfluxor of FIG. 7 is fabricated in the form of a disk 65 of magnetic material having a large aperture 68 and a small aperture 69. A relatively long flux path 66 encompasses both apertures, and a relatively short flux path 67 encompasses only the smaller aperture 69. The ratio of the length of the longer flux path 66 to that of the shorter flux path 67 is large (for example, 4:1). Typical dimensions, in inches, of the two-aperture transfluxor are shown in FIG. 7. The thickness of the disk 65 may be of the order of 0.100 inch. The positive and negative setting pulses are supplied by a pulse source 70 to a winding 71 which links the magnetic material limiting the aperture 68. Pairs of preferably asymmetric, positive and negative current pulses are supplied by an A.C. source 72 to a winding 73 which links the material limiting the aperture 69. The positive directions of current flow in the windings of FIG. 7 are indicated by arrows adjacent these windings. An output winding 74 links a leg 76 of the transfluxor between the aperture 69 and the outer periphery of the disk 65. The winding 74 is connected across a load which may be, for example, an electrically-responsive light source, such as a lamp 75. Illustratively, for a transfluxor having the above dimensions, and operating in the Mode II described above, the negative setting pulse from the pulse source 70 may be of the order of two ampere-turns, and the positive setting pulse may be of the order of two ampere-turns. An average output load drawing about 0.2 watt can be driven by pairs of current pulses from the A.C. source 72 with positive phase of an amplitude of the order of 1 ampere-turn and negative phase of the order of 0.3 ampere-turn when the transfluxor is in its signal-passing condition.

Note that a setting excitation current pulse does, in general, produce a pulse in the output winding 74 due to the change of flux in the leg 76. Also, in the Mode II type of operation, as described above, the first positive excitation pulse applied to the power winding 73 causes a voltage to be induced in the pulse source winding 71 due to the change of flux in the leg 78. However, if the magnetic circuit using a two-aperture transfluxor is used to control a long sequence of pulses applied to the winding 73, then the "feedback" power from the power source 72 to the pulse source 70 is relatively low because subsequent excitation pulses applied to the power input winding 73 do not react into the control circuit, that is, the pulse source 70. The power gain results from frequent changes of flux in the leg linked by the output winding. The flux changes are controlled by pulses in the input circuit which may occur "infrequently."

A transfluxor may be considered as a magnetic device which provides a large power or energy gain. In response to a control pulse having a very small energy level, the transfluxor is set so that it does, or does not, pass the A.C. power input signal to provide an A.C. output signal. If the transfluxor is set to provide an output signal, then the energy induced in the output winding is that derived from any desired number of flux changes in the leg linked by the output winding. If, on the other hand, the transfluxor is set to provide no output signal, substantially no output signal results regardless of the number of cycles of power input. The output signal is, in one sense, a carrier wave modulated to be at full or zero amplitude depending on the last previous setting signal. A further power gain results from the fact that the control and controlled circuits are substanially decoupled. Therefore, the characteristic of the load is relatively unimportant insofar as the control signal is concerned.

A plurality of transfluxors may be coupled together in order to obtain increased power output. In such a case, the control, the power supply, and the output windings may couple all of the transfluxors. Also, to obtain better discrimination between the blocked and unblocked conditions, the transfluxors may be connected in tandem by coupling the controlling winding through all the transfluxors, the power supply to the first, the output of the first to the supply of the second, et cetera.

Another form of transfluxor may be polarity sensitive. Referring to FIG. 8*a*, a polarity-sensitive transfluxor 80 is provided having at least five different apertures 81 through 85, inclusive. The diameters of the apertures are so chosen that there are approximately equal amounts of magnetic material in each of the legs located between adjacent apertures. This multi-aperture transfluxor has a relatively uniform thickness $t_3$, as shown in the end view of FIG. 8*b*.

An input winding 86 links the magnetic material limiting the apertures 82 and 84 by threading the winding 86 down through the aperture 82, then from behind the transfluxor plate up around an edge thereof, over the top surface, as shown, and then down through the aperture 84, and returned to an A.C. power source 87 to which it is connected. The apertures 82 and 84 are termed "the reading apertures." Aperture 83 is termed a "writing" aperture. A write winding 88, which is connected to a signal source 89, links the magnetic material limiting the writing aperture 83. Apertures 81 and 85 are termed dummy apertures. A dummy winding 90, which is connected to a D.C. source 91, links the magnetic material limiting the dummy apertures 81 and 85 by passing down through the aperture 81, then behind the transfluxor plate to the aperture 85, then up through the aperture 85 and back to the D.C. source 91. A switch 118 is interposed in the dummy winding 90. An output winding 92 links a portion of the magnetic material individual to the reading aperture 84. A different output winding 93 links a portion of the magnetic material individual to the reading aperture 82.

The operation of the magnetic system of FIG. 8*a* is as follows:

Assume that the switch 118 is closed and then opened to apply a positive excitation current pulse to the winding 90. As before, arrows adjacent the windings indicate the positive direction of current flow. This pulse establishes a saturating flux around the dummy aperture 81 in a clockwise sense and saturating flux around the dummy aperture 85 in the counter-clockwise sense. The sense of the saturating flux flow is indicated by the arrows adjacent the dummy apertures 81 and 85. The sense of the saturating flux about the two dummy apertures 81 and 85 is different because the winding 90 passes through dummy aperture 81 in a downward direction (as viewed in the drawing) and through the dummy aperture 85 in an upward direction. The setting of the legs limiting the dummy apertures may be a fabrication step, the legs being set once and for all, and the winding 90 may now be removed.

Assume, now, that a positive excitation current pulse is applied to the write winding 88 by signal source 89. The intensity of the positive excitation current is made sufficient to establish a clockwise flux flow around the aperture 83 only. The clockwise saturating flux is indicated by the solid arrows adjacent the aperture 83. Consider the effect of a train of one or more pairs of postive and negative excitation current pulses which is applied to the winding 86 by the A.C. source 87. The excitation pulses of the train tend to establish a substantial flux flow about each of the reading apertures 82 and 84. Because of the flux configuration previously established, however, only the flux about the reading aperture 82 is reversed. This results from the fact that the flux previously established about the aperture 82 was in a counter-clockwise sense. The flux previously established about the aperture 84, on the other hand, was and remains in opposite senses with reference to the aperture 84 in the legs adjacent thereto. Therefore, voltages are induced in the output winding 93, but not in the output winding 92, by these reversals.

Consider, now, the effect of a negative excitation current pulse applied to the write winding 88 by the signal source 89. The previously established clockwise saturating flux about the aperture 83 is reversed, and a counter-clockwise saturating flux is established with reference to the aperture 83. The sense of the counter-clockwise saturating flux around the aperture 83 is shown by the dotted arrows adjacent thereto.

In the case of the negative excitation write current, the sense of saturating flux flow around the aperture 84 is clockwise in both its adjacent legs. However, the saturating fluxes established in the legs adjacent to the aperture 82 are now in senses opposite to each other with reference to the aperture 82. Consequently, when the train of pairs of positive and negative excitation pulses is applied to the winding 86, only the flux flow around the aperture 84 reverses. Therefore, output voltages are induced only in the output winding 92. The flux flow about the aperture which responds to the train of positive and negative pulses is always returned to its initial sense and, therefore, the read-out is non-destructive. For example, the initial clockwise flux flow around the aperture 84 is reversed by the negative excitation pulse of the winding 86, and the following positive excitation current reverses the saturating flux back to the clockwise sense.

The multi-aperture transfluxor can also be arranged to furnish a positive-negative or negative-positive pulse combination on an output winding in accordance with the polarity of the write excitation current pulse. Referring to FIG. 8*c*, there is shown a magnetic system similar to that of FIG. 8*a* with the exception that a single read winding 96 is provided in lieu of the read windings 92 and 93 of FIG. 8*a*. The read winding 96 is threaded down through the aperture 81, then up through the aperture 82, then in front of the transfluxor plate to and down through the aperture 84, then up through the aperture 85, and returned to the output. A saturating flux flow is established about the dummy apertures as described in connection with FIG. 8*a*.

In operation, the positive or negative write pulse is applied to the write winding 88 by the signal source 89. The pairs of excitation pulses are applied to the reading apertures 82 and 84 by means of the power input winding 86, as before. If a positive excitation current pulse is applied to the write winding 88 by the signal source 89, a clockwise saturating flux is established around the writing aperture 83, as shown by the solid arrows adjacent thereto. Thus, only the flux in the legs which limit the reading aperture 82 can reverse direction when a pair of pulses is applied to the winding 86. The first positive excitation current pulse in the winding 86 establishes a clockwise saturating flux flow about the aperture 82, and the following negative excitation current pulse changes the sense of the saturating flux flow to its initial, counter-clockwise sense. The output pulse combination induced in the output winding 96 is illustrated at 97 to be a voltage pulse of one polarity, taken as positive, followed by a pulse of the opposite polarity.

Conversely, when a negative excitation current pulse is applied by the signal source 89 to the write winding 88, a saturating flux flow in the counter-clockwise sense with respect to the aperture 83 is established, as illustrated by the dotted arrows. Thus, only the legs limiting the aperture 84 respond to the pairs of excitation pulses applied to the winding 86. The first negative excitation pulse in the winding 86 from the A.C. source 87 establishes a counter-clockwise flux flow about the aperture 84, and the next succeeding positive excitation current pulse changes the flux flow around the aperture 84 back to its initial clockwise sense. A different output pulse combination 98 consisting of a negative pulse followed by a positive pulse is thus induced in the output winding 96. Note, however, that if the first excitation pulse in the winding 86 is positive for that first positive pulse, only the flux flow around the aperture 84 remains substantially unchanged.

Furthermore, the manner of threading the output winding 96 through the apertures 82 and 84 aids in elimination of the "noise" voltage in the output signal. Again, "noise" represents a signal which exists because of the imperfect rectangularity of the hysteresis characteristics of the material. Thus, for example, consider the effect on the leg located between the reading aperture 84 and the dummy aperture 85 of a positive excitation pulse applied to the write winding 88. The specified leg becomes slightly more saturated in the clockwise sense because of the imperfect rectangularity of the hysteresis loops of the material and the change of flux in this leg induces a noise voltage opposite to the read-out voltage in the output winding 96. However, the effect of this noise signal is to reduce the amplitude of the output signal induced in the output winding 96 resulting from the large flux change around aperture 82. Consequently, the noise signal is thus overridden by the much larger desired output signal. The noise signal resulting from the negative excitation pulse applied to the winding 88 is similarly overridden by the desired output signal.

Note that the manually-operated pulse sources, such as the circuit comprising the battery 110, switches 111 and 112, and resistor 121 of FIG. 1*b*, or the like circuit of FIG. 6*a*, may be employed as the pulse source 47 of FIG. 5*a*. Further, suitable electronic pulse sources, for example, employing vacuum tubes, may be employed for any of the pulse sources or any of the A.C. sources shown herein.

Also note that the transfluxor has two conditions characterized herein respectively as signal-blocking and signal-transmitting. However, the roles of these conditions may be interchanged, for example, by inserting the A.C. source 72 in series with the load, the lamp 75, in the arrangement of FIG. 7. In this case, the condition of the transfluxor formerly denominated signal-blocking actually causes a signal to be passed, because the source 72 has in series a comparatively low-impedance winding, the current in which causes substantially no flux change in the transfluxor. Conversely, the signal-transmitting condition of the transfluxor now causes the series source to be substantially blocked, because the source is in series with a comparatively high-impedance winding which changes flux substantially, thereby self-inducing a comparatively large back E.M.F.

SUMMARY

From the foregoing, it is clear that the various transfluxors of the present invention herein described are inexpensive, easily constructed, magnetic devices which can perform a variety of useful functions advantageously. Examples are as follows:

(*a*) As a control device, a transfluxor can control the transmission of an alternating signal which is applied to the excitation winding linked to the magnetic material limiting the aperture around which the selected flux path is taken. When a transfluxor is set to a signal-blocking condition, the alternating input signal is not transmitted. When the transfluxor is set to a signal-transmitting condition, the alternating input signal is transmitted. By suitably selecting the number of turns, step-up or step-down ratios are obtainable.

(*b*) As a one-bit storage register, the transfluxor is also very useful. In information-handling and computing systems a wide use is made of one-bit storage registers. A common example of such a register is a flip-flop circuit. Although magnetic toroids have also been used for this purpose, they have the disadvantage that a feedback or rewrite circuit must be associated therewith because the read-out is destructive. Furthermore, the reading and writing circuits of the toroids are tightly coupled by virtue of the fact that they are commonly linked to the same toroid.

The transfluxor devices overcome these disadvantages. By applying a high-frequency alternating signal to a transfluxor, a continuous, visual or other suitable indication of the stored information can be obtained. A typical example of the use of a transfluxor as a one-bit storage register is illustrated in FIG. 7 of the drawing. The state of storage of the device may be displayed by the indicating lamp 75 when radio-frequency current is applied to the winding 73. The lamp 75 may be of an incandescent type in order conveniently to match the low impedance of the lamp to the low impedance of the single-turn linkage of the magnetic circuit.

(*c*) As a command-storing gate, the transfluxor has another useful function. Here, it may be used as a gate for the interrogating pulses which are gated for either blocking or passage in response to a writing or control signal, the gate obeying the last command continuously.

A two-aperture command storing gate may be that shown in FIG. 6*a* or FIG. 7, for example. The circuit used to set the transfluxor may also be of a multi-coincident type wherein the simultaneous presence of two or more setting signals is required to set the transfluxor. Thus, in the modification of FIG. 7, for example, the winding 71 may be supplied with two discrete sets of current pulses which must be coincident in order to provide sufficient magnetizing force to establish a flux flow in the longer path 66 which encompasses both apertures 68 and 69. A different winding, such as the winding 71, may be employed for each set of current pulses, if desired. Two different modes of operating the two-aperture transfluxor have been described. The mode of operating the two-aperture transfluxor of FIG. 5*a* employs symmetrical reading pulses. The mode of operating the transfluxor of FIG. 6*a* employs asymmetrical reading pulses. The two-aperture transfluxor of FIG. 7, however, is for some purposes preferred over the two-aperture transfluxor of FIG. 5*a*.

A magnetic system using a three-aperture transfluxor as a command storing gate is shown in FIG. 1*b*. Various arrangements to obtain improved signal-to-noise ratios for the three-aperture gate or storage register are shown in FIGS. 4*a*, 4*b*, and 4*c*.

(*d*) The transfluxor device is also useful as a polarity-sensitive circuit. That is, in response to a positive pulse applied to an input winding, an output signal can be furnished on an output winding in accordance with the condition of the transfluxor in response to a previous control or writing circuit. FIGS. 8*a* and 8*c* illustrate examples of this type of polarity-sensitive circuit.

From the foregoing, it is apparent that the transfluxor affords a great many different advantageous uses for the control of energy or for the storage of signals.

What is claimed is:

1. A magnetic system comprising a magnetizable medium having the characteristic of being substantially saturated at remanence, said medium having a plurality of aligned apertures providing a plurality of adjacent flux paths within said medium, one of said paths being between at least two others of said paths and having first and second portions in common, respectively, with said two other paths, means for establishing along one of the said two other flux paths a saturating flux in a first of said portions in a first sense with respect to said one path, and means for establishing along the other of said two other flux paths saturating flux in said second portion selectively either in said first sense or in the opposite sense with respect to said one path.

2. A magnetic system comprising a body of magnetic material capable of being saturated at remanence by saturating flux flow in one or the other of two different senses, said body having three aligned apertures providing at least three adjacent flux paths within said medium, an intermediate one of said flux paths including two different portions, one of said portions being in common with a part of one of said adjacent flux paths, the other of said portions being in common with a part of another of said adjacent flux paths, and means for establishing said common portions selectively either in the same or in opposite states of saturation at remanence with reference to said intermediate flux path.

3. A device comprising a body of magnetic material having the characteristic of being substantially saturated at remanence, said body having at least three apertures and three windings linking respectively the material limiting said apertures, means for applying separate electrical impulses respectively to the windings linking the magnetic material limiting two of said apertures, and means for applying an alternating electrical signal to the third of said windings.

4. A device as recited in claim 3 including an output winding linking a portion of the magnetic material limiting said third aperture.

5. A device as recited in claim 3 wherein said two electrical impulses are successively applied by said first named means to said windings.

6. A device as recited in claim 3 wherein said two electrical impulses are simultaneously applied by said first named means to said windings.

7. A device as recited in claim 3 wherein the dimensions of said apertures are substantially equal.

8. A device as claimed in claim 3 wherein said body has flux paths, one individually around each of said apertures, the smallest cross-sectional dimensions of magnetic material in each of said flux paths being substantially equal.

9. A device as claimed in claim 3 and further including an output winding, said body having flux paths one individually around each of said apertures, each of two portions of one of said flux paths being in common with a portion of a different one of the other of said paths, said output winding linking the magnetic material in a portion of said one flux path other than said two common portions.

10. A magnetic device as claimed in claim 3 and further including an output winding, said body having individual flux paths in said material one about each of said apertures, each of two portions of one of said flux paths being in common with a portion of a different one of the other of said paths, said output winding linking the magnetic material in one of said two common portions of said one flux path.

11. A magnetic device as claimed in claim 3 and further including an output winding, said body having individual flux paths in said material one about each of said apertures, each of two portions of a first of said flux paths being in common with a portion of a different one of the other of said paths, said output winding linking the magnetic material in the flux path around a second of said apertures which is common to the flux paths around said first and said second apertures and a portion of the magnetic material individual to the flux path around said second aperture.

12. A magnetic device as claimed in claim 11 wherein said output winding also links a portion of the magnetic material individual to the flux path around said third aperture.

References Cited in the file of this patent

UNITED STATES PATENTS

| | | |
|---|---|---|
| 2,682,632 | Cohen | June 29, 1954 |
| 2,818,555 | Lo | Dec. 31, 1957 |
| 2,818,556 | Lo | Dec. 31, 1957 |
| 2,842,755 | Lamy | July 8, 1958 |
| 2,869,112 | Hunter | Jan. 13, 1959 |
| 2,902,676 | Brown | Sept. 1, 1959 |

OTHER REFERENCES

"The Transductor Amplifier," by Ulrik Krable, 1947, pp. 1–176 (FIGS. 3, 4 and pp. 26–27 relied on).